United States Patent [19]

Fujima

[11] Patent Number: 5,142,355
[45] Date of Patent: Aug. 25, 1992

[54] EDIT CONTROL SYSTEM FOR USE IN AN IMAGE PROCESSING APPARATUS

[75] Inventor: Toshitaka Fujima, Kanagawa, Japan
[73] Assignee: Fuji Xerox Co., Ltd., Tokyo, Japan
[21] Appl. No.: 631,000
[22] Filed: Dec. 19, 1990
[30] Foreign Application Priority Data
Dec. 20, 1989 [JP] Japan ............................. 1-330343
[51] Int. Cl.⁵ ............................................. H04N 1/46
[52] U.S. Cl. ......................................... 358/75; 358/76
[58] Field of Search ................................... 358/75-80
[56] References Cited

U.S. PATENT DOCUMENTS

| | | | |
|---|---|---|---|
| 4,110,826 | 8/1978 | Möllgaard et al. | 358/75 |
| 4,692,796 | 9/1987 | Yamada et al. | 358/76 |
| 4,792,847 | 12/1988 | Shimazaki et al. | 358/80 |
| 4,953,012 | 8/1990 | Abe | 358/75 |
| 5,032,904 | 7/1991 | Murai et al. | 358/75 |

Primary Examiner—Stephen Brinich
Attorney, Agent, or Firm—Finnegan, Henderson, Farabow, Garrett and Dunner

[57] ABSTRACT

Disclosed herein is a paint processing system in use with an image processing apparatus which converts separated color signals, which are produced by reading an original document, into record signals of developing colors, selects a record signal from among those record signals in each developing cycle and records and reproduces an image of the original document, and is capable to paint out a closed area in an original document by a specific pattern or color.

4 Claims, 21 Drawing Sheets

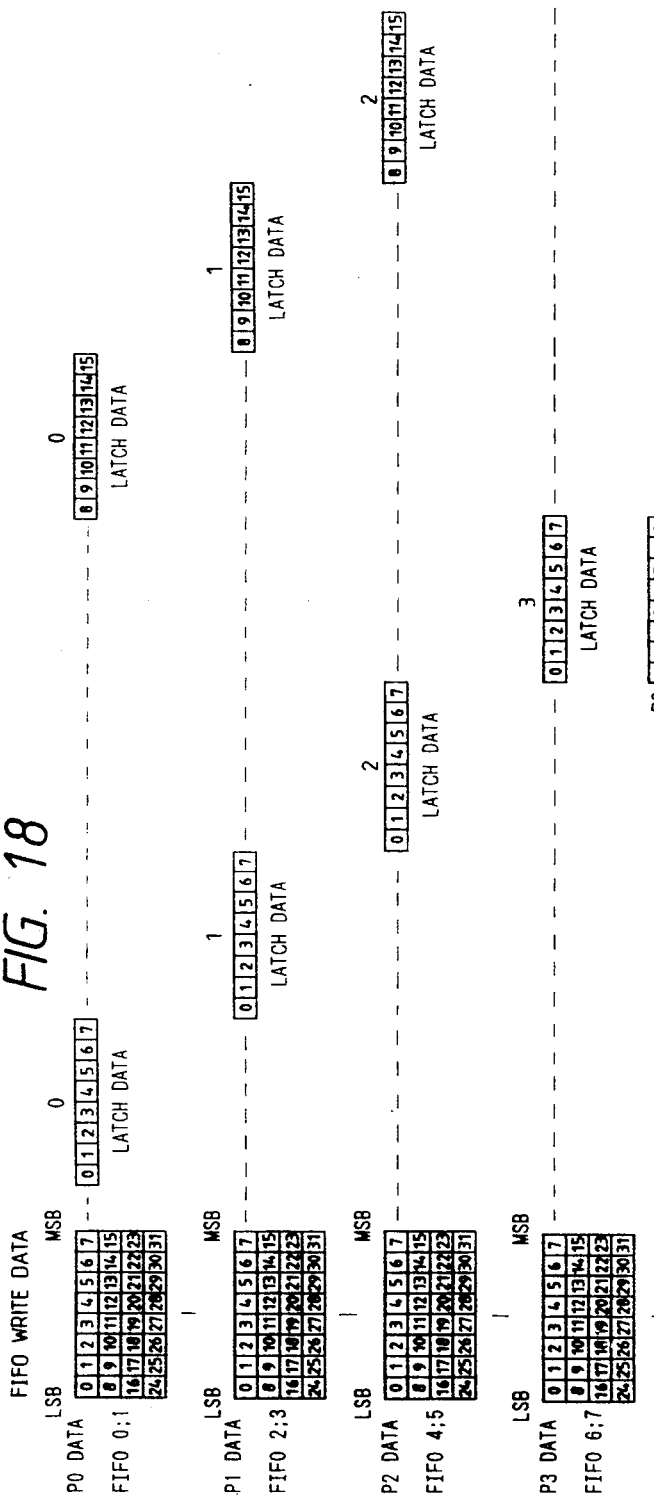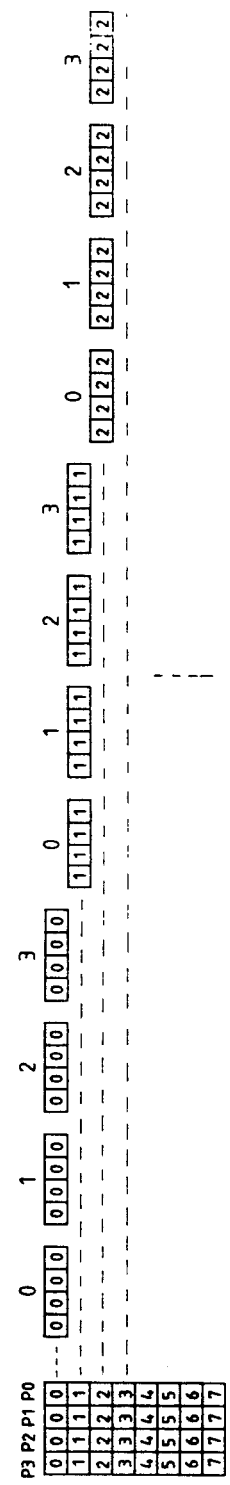

EDIT CONTROL SYSTEM FOR USE IN AN IMAGE PROCESSING APPARATUS

BACKGROUND OF THE INVENTION

The present invention relates to a paint processing system in use with an image processing apparatus which converts separated color signals, which are produced by reading an original document, into record signals of developing colors, selects a record signal from those record signals in each developing cycle and records and reproduces an image of the original document, and is capable to paint out a closed area in an original document by a specific pattern or color.

A recent image processing apparatus is able to readily pick up full color read signals in the form of separated color signals by using a CCD line sensor. The separated color signals are converted into record signals of toner or another color material. A laser beam, which is driven by the record signals, is applied onto a photo-sensitive structure. With the laser beam applied, a latent image is depicted on the photo-sensitive structure. The latent image is subjected successively to developing, transferring and fixing processes. Finally, a color image of the original is reproduced. The separated color signals as analog signals derived from the CCD line sensor are converted into digital signals of high gradation. The image read can be stored, converted, adjusted, and composed in the form of the digital signals. Accordingly, various types of image edits are possible. By the technique, a color copying machine, color printer, facsimile, and the like may have various functions, such as trimming (image extraction), masking (image erasure), insertion of logo type, coloring, paint, color conversion, negative/positive inversion, and enlargement and reduction, in addition to the function of merely reproducing the color image.

In circle graphs, a specific area or areas in the circuit are frequently painted with a specific color or colors or a specific pattern or patterns. The same thing is true for bar graphs. In drawings, particularly complicated drawings, it is convenient to color a specific portion for good discrimination. In a technique to realize this, binary image data of an original document is first fetched through a prescan. A point within an area to be colored is then designated as an edit point. Finally, the closed area containing the edit point is painted out with a color or a pattern.

The painting technique paints only an area within the closed area containing the edit point with the color or pattern, with the edit point as a start point. Accordingly, when a character with a closed line or a closed loop is present in the closed area, the closed portion is not painted. For example, a character "S" is completely painted with color. In the case of characters "P" and "O", the closed portions are not colored. Thus, non-color portion appears in the designated closed area. This will be described in more detail with reference to FIG. 24.

In the coloring processing, a bit map memory is initialized to "0". Prior to a copy scan, a prescan is applied to an original document to read an image on the document. The read data is depicted in the bit map memory. Then, a paint-out processing is applied to the depicted data. In this case, the read data, which is depicted in the bit map memory, is as shown in FIG. 24(a). As shown, a character "P" is enclosed by a square frame. "1" is assigned to black pixels, and "0", to white pixels. A pixel marked with "*" is designated as an edit point in the bit map of the memory. Upon designation of the edit point, "N", which is different from "1" is applied successively to the pixels in an area between the pixels "1", as shown in FIG. 24(b). The application "N" starts from the edit point. Accordingly, the pixels within the closed portion of the "P" remain "0" as the initial value, as shown. Under this condition, if the copy scan is performed, and an image processing is applied to the contents of the bit map memory, the resultant image is as shown in FIG. 24(c). As shown, only area between the square frame and the figure "P", both being filled with slanted lines, is colored as indicated by mesh. The closed area of the "P" remains uncolored.

This undesirable phenomenon also occurs in graphic patterns with closed areas. To avoid the phenomenon, the edit point must be designated for all of the closed areas in graphic patterns and characters. The edit point designating operation is troublesome and time consuming.

SUMMARY OF THE INVENTION

Accordingly, an object of the present invention is to reliably color a closed portion of an object image contained in a closed area when the closed area is colored.

MEANS TO SOLVE THE PROBLEM AND OPERATION

To achieve the above object of a paint processing system in use with an image processing apparatus, as shown in FIG. 1, which converts separated color signals, which are produced by reading an original document by an image input terminal (IIT) 1, into record signals of developing colors by an image processing system (IPS) 2, selects a record signal from among those record signals in each developing cycle, and records and reproduces an image of the original document by an image output terminal(IOT) 3, the IPS 2 including image data processing means 4 and 6, and paint processing means 5 for painting out a closed area on an original document by a specific pattern or color, the paint processing system wherein the paint processing means 5 includes a plane memory 7, binary image data of an original document gathered through a prescan is stored into the plane memory 7, a closed area of the binary image data is painted out starting from a start point as a designated point within the closed area, and an area outside the painted-out closed area is painted out, and an area inside said painted-out outside area is painted out by a specific pattern or color.

Thus, in the paint processing system of the invention, an area outside the closed area to be painted out is painted out, and an area inside the outside paint-out area is painted out by a specific pattern or color for painting. Therefore, if a closed line exists within the closed area, the paint processing is executed irrespective of such a line.

Further, a plurality of memory planes are provided for paint and an outside paint-out area is drawn in a memory plane for work, and an area command to paint by a specific pattern or color is set in a memory plane for drawing on the basis the outside paint-out area drawn in the memory plane for work. A plurality of memory planes are provided for drawing, and an area command is set for each area in the plurality of memory planes.

Accordingly, binary image data is stored into the first work plane memory plane, while the closed area is drawn in the second work memory plane. On the basis of this, the reverse paint-out operation can be done. Further, since the area command is set up for the plurality of memories, a color and a pattern can be designated and selected by the area command.

BRIEF DESCRIPTION OF THE DRAWINGS

FIG. 6a–6e are diagrams for explaining a painting operation by the later-designation precedence;

FIGS. 7a–7e show diagrams showing the coloring of a marker designated area;

FIG. 9a–9e show explanatory diagrams for explaining the coloring of a rectangular area;

FIGS. 18 and 20 are diagrams showing flows of FIFO read data;

DESCRIPTION OF THE PREFERRED EMBODIMENTS

A preferred embodiment of the present invention will be described with reference to the accompanying drawings.

Before proceeding with the detailed description of the preferred embodiment, it should expressly be understood that in the description to follow, an image recording apparatus will be described as a color copying machine, but it may be any of a printer, facsimile, and other image recording apparatus. The contents of the description are given below for good understanding of the description.

CONTENTS (I) PAINT PROCESSING SYSTEM
   (I-1) Memory for Paint Processing
   (I-2) Flow of Paint Processing
(II) EDIT CONTROL UNIT
   (II-1) Circuit Arrangement
   (II-2) Operation
   (II-3) AGDC
   (II-4) DMC
   (II-5) IRE
   III-6) Annotation Processor
(III) OVERALL PROCESSING FLOW.
(I) Paint Processing System
(I-1) Memory for Paint Processing FIG. 2 is a diagram showing an arrangement of a plane memory.

Figure 1:
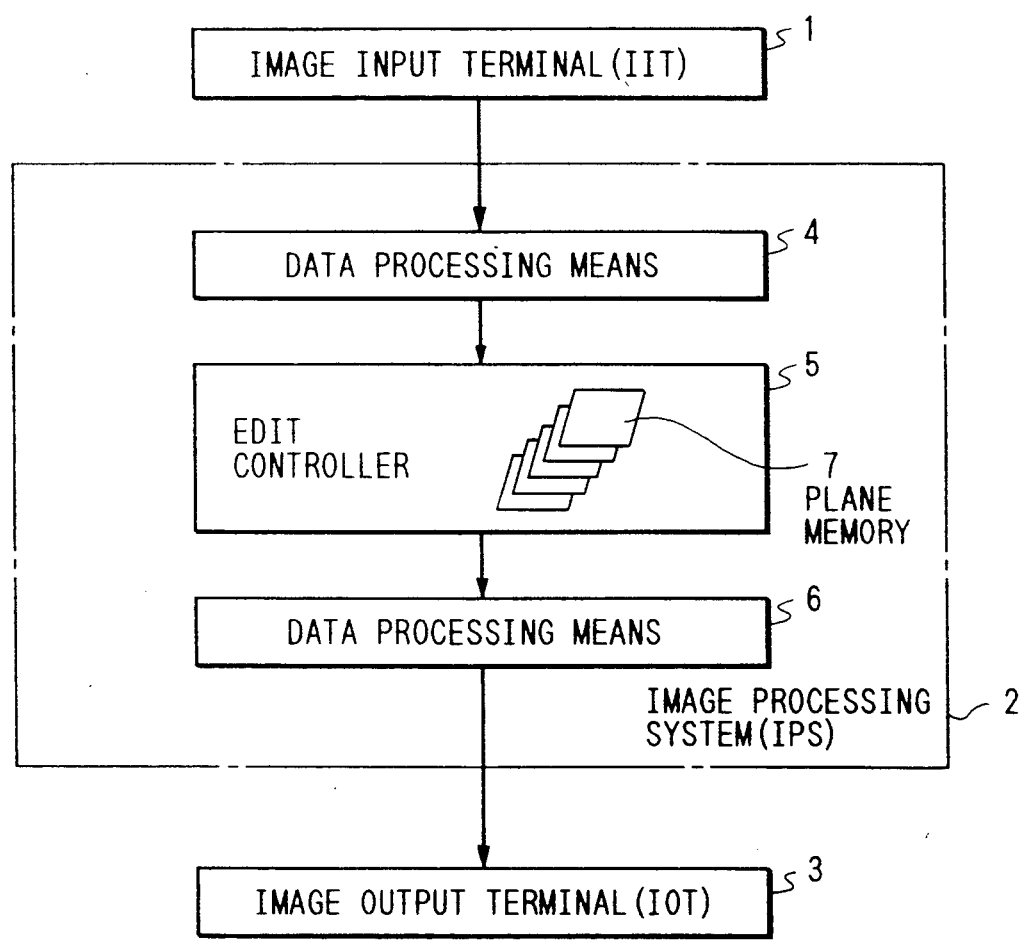
FIG. 1 is a block diagram showing an arrangement of a paint processing system in use with an image processing apparatus according to the present invention.
Figure 2:
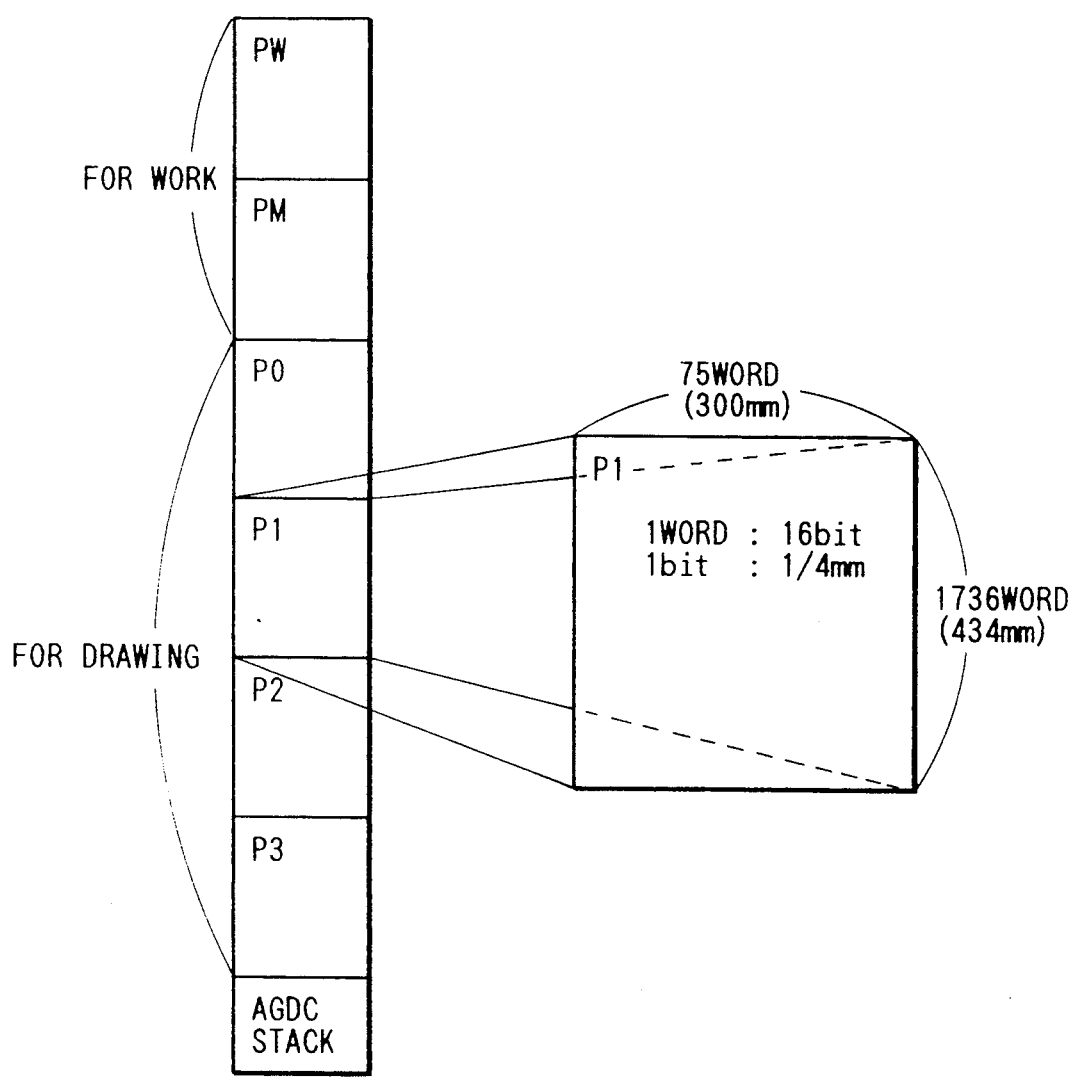
FIG. 2 is a diagram showing an arrangement of a plane memory.
Figure 3:
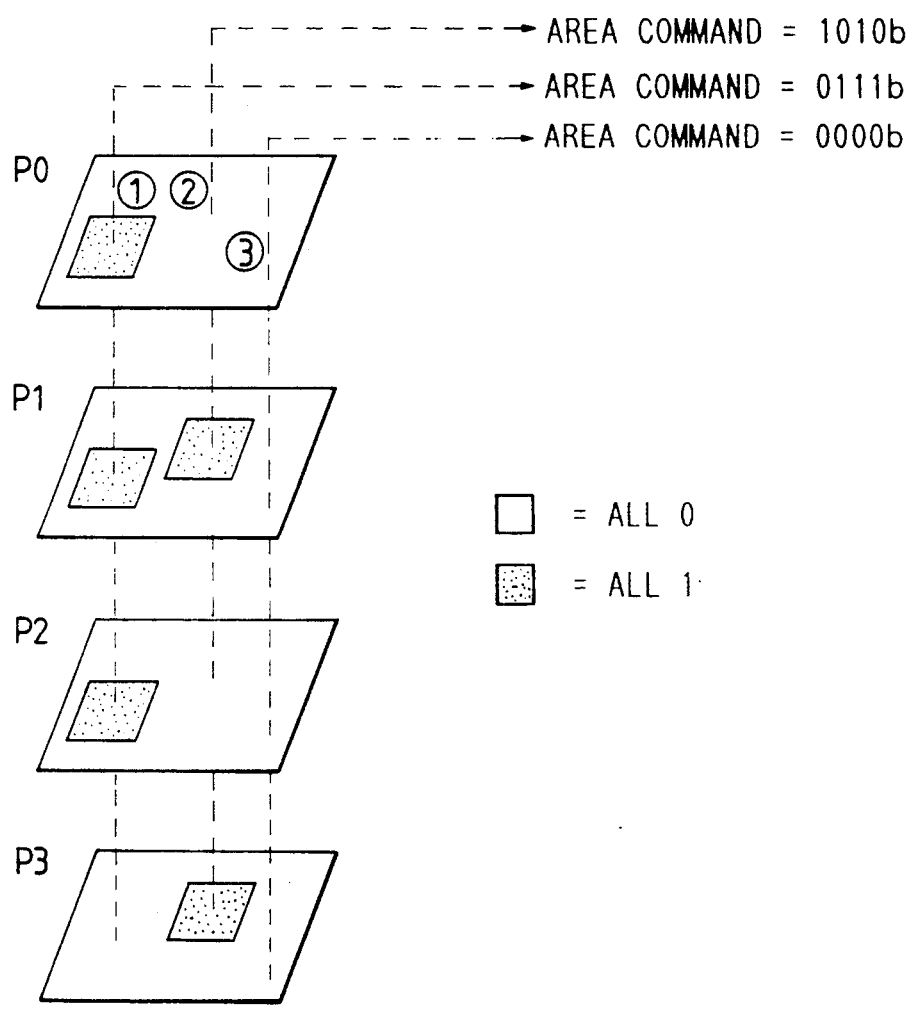
FIG. 3 is an explanatory diagram for explaining area commands.

The plane memory shown in FIG. 2 consists of a total of six memory planes, two binary data planes for work and four planes for drawing. For the specifications of 4 dots/mm for resolution, and 435 mm for the main scan direction and 300 mm for the vertical scan, 1.5M byte bytes are required for a memory capacity of the plane memory. A plane memory for work (PW) is for storing binary data in a paint scan mode, for example. If necessary, it may store a marker area in a marker scan mode. Another work plane memory PM is used for drawing a paint area and for forming a pickup area. Memory planes for drawing P3 to P0 follows. In the planes, bit patterns are used for area commands. The correspondences between drawing contents and the area commands in the planes P3 to P0 are as shown in FIG. 3. As shown, an area command consists of four bits "P3, P2, P1, P0". An area command of an area (1) is "$011_B$"($07_H$) because the plane P3 is "0", and the planes P2 to P0 are each "1". An area command of an area (2) is "$1010_B$"($0A_H$) because the planes 3 and P1 are each "1". An area command of an area (3) is "$0000_B$"($00_H$) because the planes P3 and P1 are each "1".

(I-2) Flow of Paint Processing

Figure 4:
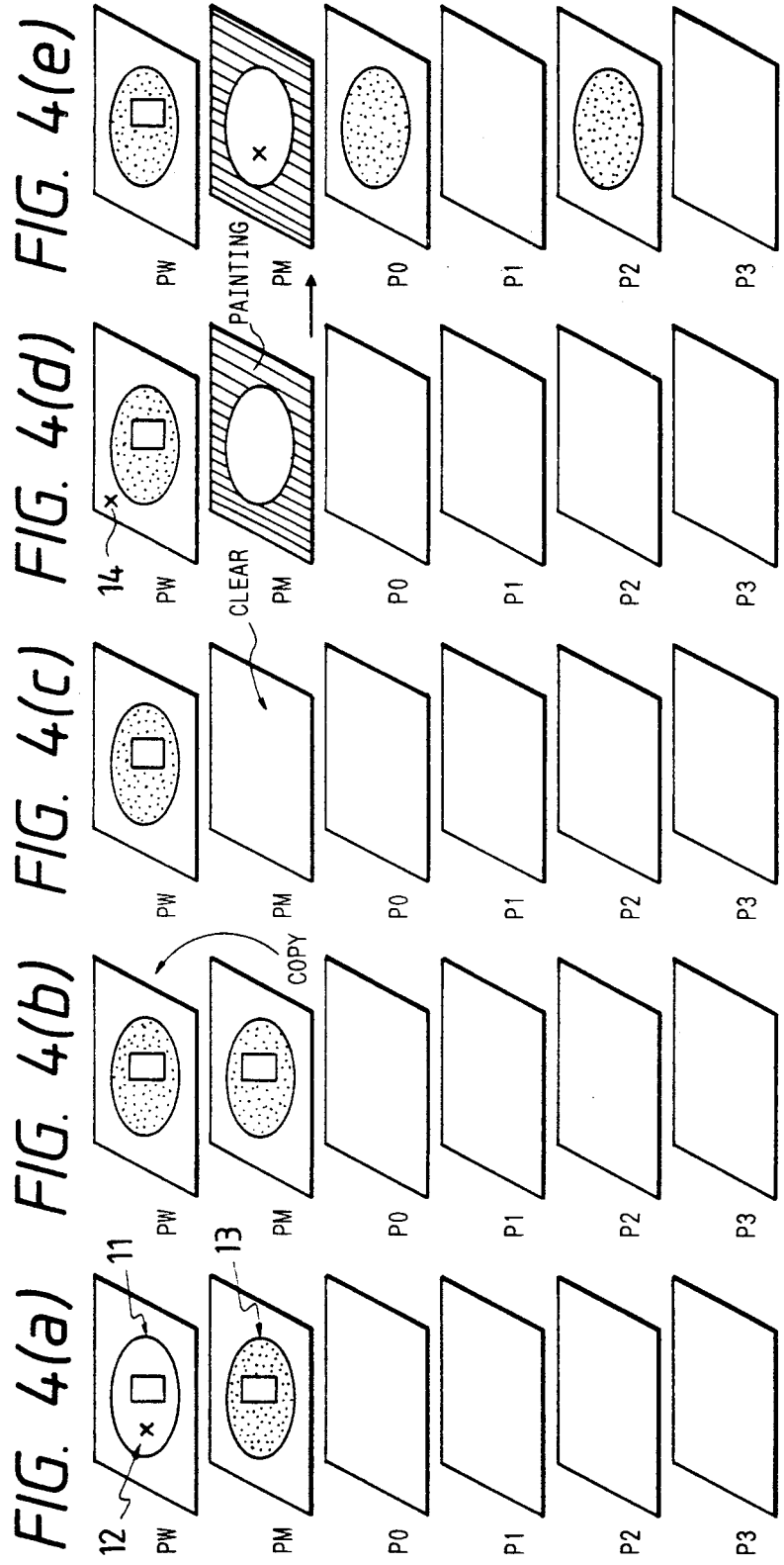
FIGS. 4a–4e are an explanatory diagram for explaining how to set the area command.

FIG. 4 is an explanatory diagram for explaining the flow of a paint processing according to the present invention.

To start, as shown in FIG. 4(a), binary image data 11 is stored into the memory plane PW, through a paint scan. Thereafter, a paint start point (edit point) 12 is designated. The plane PM is designated as a plane for drawing, and a paint command is issued. Then, a drawing 13 is depicted in the plane PM, as shown.

Next, the plane PW is designated as a terminating plane, and the plane PM, as an originating plane. And a copy command is issued. Then, the drawing 13 is copied in the plane PW, as shown in FIG. 4(b).

Afterwards, the plane PM is designated as a drawing plane, the drawing contents are set to "ALL 0", and a rectangular paint command is issued in a drawing mode. Then, the plane PM is cleared as shown in FIG. 4(c).

Succeedingly, the plane PM is designated as a plane for drawing, a paint start coordinates 14 is set outside the drawing 13, and a paint command is generated. Then, an area outside the drawing 13 is painted as shown in FIG. 4(d). Finally, the planes for drawing P3 to P0 are selected on a color or pattern and a paint command is generated, In response to the paint command, an area command is drawn in the planes P3 to P0.

In this instance, the area command is "0101$_B$"(05$_H$) and a closed area is painted by the area command.

(II) EDIT CONTROL UNIT

An example of an edit control unit with a paint processing system according to the invention will be described in detail.

(II-1) Outline of Circuit Arrangement

Figure 5:
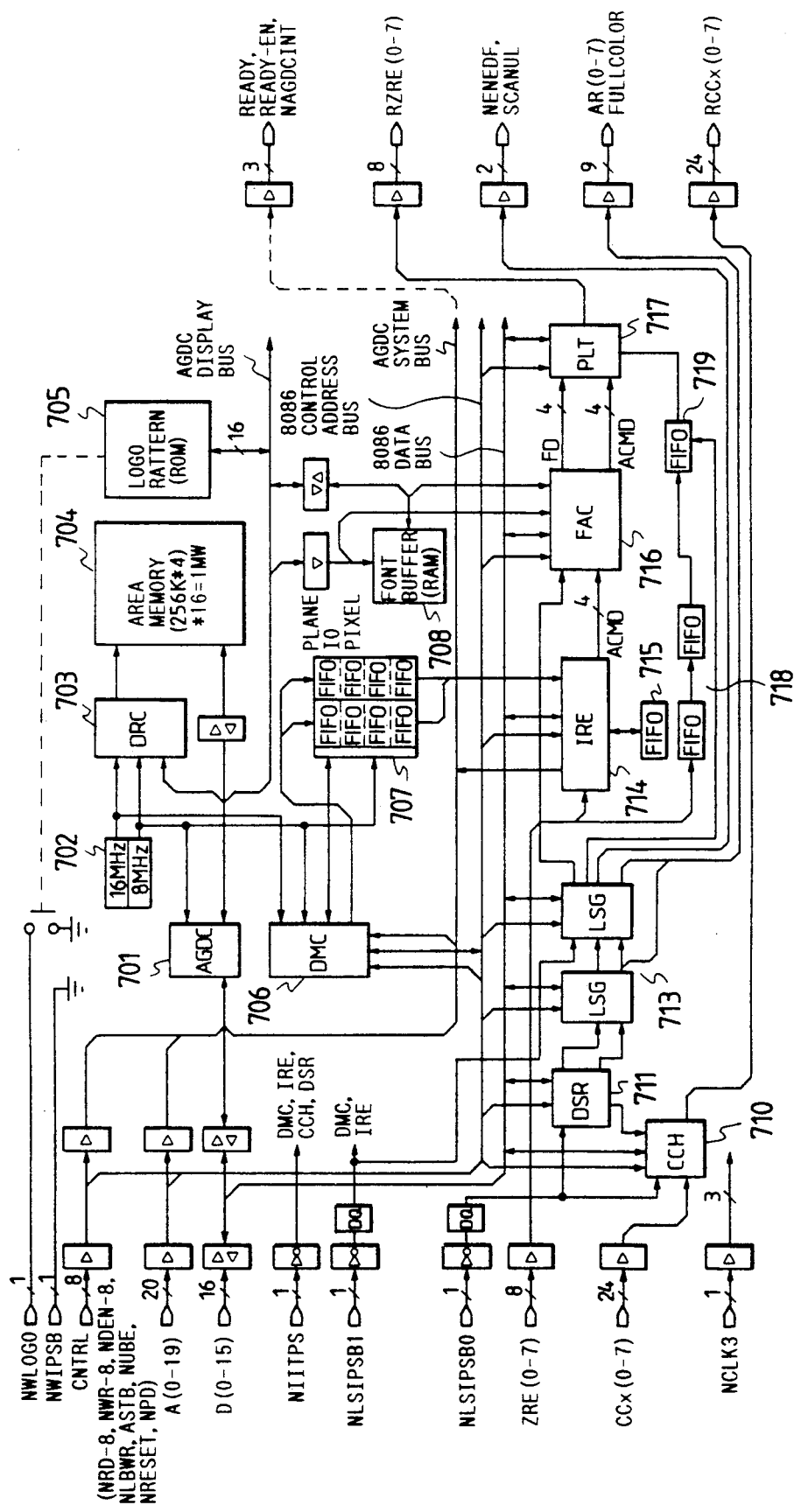
FIG. 5 is a block diagram showing a layout on an edit control unit circuit board on which LSIs for annotation including painting, area designation, color conversion, and the like are mounted.

FIG. 5 is a block diagram showing a layout on an edit control unit circuit board on which LSIs for annotation including painting, area designation, color conversion, and the like are mounted.

As shown in FIG. 5, on the circuit board are mounted an AGDC (advanced graphic display controller) 701 as a circuit for an annotation processing, plane memory 704, DMC (DMA controller) 706, FIFOs 707 and 715, IRE (image reduction and enlargement controller 714, FAC (font address controller 716, a PLT (palette) 717 and the like, those circuits making up an edit control module, and an area designating circuit 711 as a circuit for generating area commands for adjustment function and a color conversion circuit 710 as a circuit for converting a color on an original document into a designated area or color, both making up an area image control module.

In the annotation processing circuit, character (foreground) and/or background is replaced by mesh, hatching, or solid in a marker area, closed area, rectangular area, or a free-shape area. A logo insertion is also performed. To this end, as for an area designated by a coordinates input signal produced by a marker scan, a closed area scan or a digitizer, binary image data is first stored into the plane memory 704, as already stated. Then, an area command is depicted within that area. In a main scan mode, the data is read out therefrom, and replaced by image data. In the circuit for generating area commands for adjustment function, an area and a command that are designated by the coordinates entered by a user interface (UI), are set in the memory. In a main scan mode, it is read out therefrom to control the adjustment function. One of the circuits to generate the command is the color conversion circuit 710. In the main scan mode, color conversion and other adjustment functions processings within a designated area are applied to image data. The resultant image data is subjected to the annotation processing. The blocks of those circuits will be described in brief.

The plane memory 704 stores commands used for replacing an input image with any of masking, logo, and the like. The annotation processing is applied to a fixed area. A resolution, which is less than that for the input image, suffices for the annotation processing. For this reason, the plane memory 704 is designed such that it consists of four memory planes each of A4 size 432 mm for the vertical scan direction and 300 mm for the main scan direction, and is capable of sending colors and patterns corresponding to bit images depicted in the four memory planes. Therefore, the processings of 2$^4$, or 16 types are allowed. Those may generally be categorized into two types; "coloring within a closed area" (painting) to paint a white portion within a closed area including a designated one point with a color or a pattern, and "coloring within a rectangular area" to paint a rectangular area, which is designated by two points with a color or a pattern, with a color or a pattern. More specifically, those are the coloring of an area within a frame by designating a point within an area, color conversion for changing black into a certain color in a monocolor original document, mesh with an original image being left, mask for painting the area with white (making there transparent), trimming for painting an area outside the area, designated movement like pickup, painting of erasing the original image, and the like.

The AGDC (advanced graphic data controller) 701, which provided for the hardware control of the memory, fetches a marker image and a closed area frame image, and stores then into e plane memory 704 in a closed area scan and a marker scan, or draws a bit pattern in the memory 704. In a main scan mode, it sends a bit pattern to the plane memory 704.

The IRE (image reduction and enlargement controller) 714 binarizes, enlarges, and reduces image data by using the FIFO 715, and transfers the results through the DMC (direct memory access controller) 706 to the AGDC 701, in the prescan. In the main scan, it receives the transfer data in the AGDC 701 from the FIFO 707, and enlarges the same.

The DMC 706 responds to a DMA write command and a put command, and transfers data from the IRE 714 to the AGDC 701. In response to a DMA read command and a get command, the DMC 706 transfers data from the ADGC 701 to the IRE 714. For the data transfer from the AGDC 701 to the IRE 714, the FIFO 707 intervenes therebetween, and the data of the four planes in the memory plane 704 is transferred. As for the data transfer from the IRE 714 to the AGDC 701, the data of one plane of the memory 704 is transferred The FAC (font address controller) 716, when the area command relates to mesh or logo, reads bit map pattern data from a font buffer, and sends it to the PLT (palette) 717.

The PLUT 717 receives a mesh pattern or a logo from the FAC 716, and composes them on the document, and sets a color corresponding to an area command in the four plane memories 704. In this case, the color component data output every developing color Y, M, C and K is set. Further, the data is set after it is converted by a TRC-LUT (tone reduction control look-up table). This is done in order to reflect density, contrast, and color balance on the data.

A logo pattern ROM 705 is additionally provided, and set by a user, and the mounting or demounting of the ROM is indicated by an on/off signal. A font buffer 708 is provided. A logo pattern is read out of the logo pattern ROM 705 by the AGDC 701, and is subjected to a processing of rotation, for example, and then is copied in the font buffer 708. A mesh pattern is also depicted in the same. A line sink generator 713 generates a sync signal corresponding to an image signal, which is delayed when pipe-line processed. The FIFO 718 delays the image data line by line in correspondence with a delay amount by the pipe-line processing. The FIFO 719 is for adjusting a delay amount of less than one line.

The circuits as briefly stated make up the edit control module for executing an annotation processing. The area designating circuit 711, which partially forms the area image control module, operates as follows. When areas expressed by the x-y coordinates system, and the types of edit for the areas are set by the UI, the circuit 711 generates area commands in the respective areas, and applies table select signals for color masking, color conversion, UCR (under color removal), spatial filter, and TRC (tone reduction control), and the like. The color conversion circuit 710 operates such that a comparison color to determine an object for color conversion processing, and a color to be converted are designated, and it performs the processing of coincident color conversion/noncoincident color conversion according to an area command that is applied from the area designating circuit 711.

(II-2) Operation

An outline of an overall operation of the edit control unit thus arranged will be described.

As for the edit, an area to be edited and the type of edit to be applied thereto are designated by the UI (user interface). The area designating data based on the coordinates values as entered by a digitizer or keys are loaded into the AGDC 701, and the area designated by the coordinates data is stored into the plane memory 704. The commands thereof are loaded into the registers of the area designating circuit 711.

Prior to the main scan, a marker scan or a closed area scan is performed. Then, the image input data ZRE0 to 7 are binarized, and enlarged or reduced by the FIFO 715 in the IRE 714, and in turn is transferred to the AGDC 701 by way of the DMC 706. The marker image and the closed frame image are applied to the AGDC 701, and stored into the plane memory 704. Then, through the AGDC 701, a command is set (bit pattern is drawn) within the edit area of the plane memory 704. In the marker scan mode, in the color conversion circuit 701, the marker color is converted to black on the entire area. Other colors are converted to white. Only the marker image is processed by the image input data ZRE0 to 7.

When the machine proceeds to the main scan, in the area designating circuit 711, area commands are generated for each area in eight areas including the entire area of the original, by the last designation precedence. Accordingly, the color conversion processing in the color conversion circuit 710, and the processing on other adjustment functions are performed. When the bit patterns in the plane memory 704 is output from the AGDC 701, the bit patterns are written every plane into the FIFO 707, through the DMC 706. The IRE 714 gathers the bit patterns into the data of four planes, and enlarges or reduces the data, and sends an area command ACMD to the FAC 716. In response to the area command ACMD, the FAC 716 reads bit map pattern data from the font buffer 708, and the PLT 717 composes the bit map pattern data and the image data that is sync adjusted by the FIFOs 718 and 719, and produces the image output data RZRE0 to 7.

(II-3) AGDC (A) Registers

The AGDC (advanced graphic data controller) includes various types of registers; a register STATUS showing a status of the AGDC, a register CONTROL for controlling the operation of the AGDC, a register for defining a construction of the plane memory, a register for designating coordinates, a register for designating a clipping area, and a register for setting the type of a logic operation in a drawing mode. Here, the clipping area is an area inside or outside a rectangular area appropriately defined when only the area is treated as an object area for drawing. The register for setting the type of a logic operation in a drawing mode includes registers MOD0 and MOD1, and a register PLANS. The register MOD0 is used for designating a logic operation for the plane where the bit of the register PLANS is set to "0". The register MOD1 is used for designating a logic operation for the plane where the bits of the register PLANS are set to "1". The bits of the register PLANS corresponds to the planes in one-to-one manner. In other words, up to sixteen memory planes are acceptable for the register PLANS in hardware structure.

(B) Command

As already stated, the edit processing function on the annotation may be categorized into the "coloring within a rectangular area" and the "coloring within a closed area". The commands to execute those functions are PRECFILL and PAINT.

The command PRECFILL is for painting out a rectangular area that is designated by registers X and Y (the number of bits as counted from an original) and DX and DY (the number of dots as counted from X and Y for designating the coordinates for the plane memory. The command PAINT is for painting out a closed area including a start point as the coordinates as indicated by the X and Y registers. The coloring pattern of those are set in other registers.

When an ordinary processor (e.g., a microprocessor uPD72120 manufactured by NEC in Japan) is used for the drawing processing by the AGDC, the drawing processing consists of the processing by a preprocessor for the preprocessing and the processing by a drawing processor for actual drawing operation. The command is set provided that the processing by the preprocessor terminates, as shown in FIG. 43. A status of the processing by the preprocessor is decided on bit "0" of the register STATUS. When the bit is "0", for example, it is decided that the processing by the preprocessor has terminated.

Commands to control the data transfer are a put command PUTC and a get command GETC.

The put command PUTC is a command for transferring image data to the plane memory. A coordinates value in the terminating plane memory is designated by the registers X, Y, D, and DV. The get command GETC is for sending data in the plane memory. A coordinates value in the originating plane memory is designated by the registers X, Y, DH, and DV. These commands are generated after "DMAWR" is set in a control register of the DMC for DMA transfer. The setting of the command is timed in a state that data transfer is allowed. Whether or not the data transfer is allowed is determined referring to "PUT GET READY" of the bit 7 in the register STATUS.

(C) Setting of Operating Conditions

FIG. 6 is diagrams for explaining a painting operation by the later-designation precedence.

The settings at power on are the initializing of the AGDC (registers CTRL and BANDK), the setting of the clipping area, and the like.

The clipping area is an area inside or outside a rectangular area appropriately defined when only the area is treated as an object area for drawing. This area is equivalent to a document detect effective range. The clipping area is set by the register "CLIP" in the AGDC at the time of power on or after the maker area coloring is completed, so that only the area inside the rectangular area is the object area for drawing. After the marker scan terminates, it is reset and no clipping is applied.

Also at the time of power on, a logic operation method in executing the coloring commands (RRECFILL and PAINT) is set. Assuming that a bit to be drawn is S, a bit already existing in the plane memory is D, and a bit to be drawn in the plane memory as the result of the logic operation is $D_l$, then the register MOD0 sets a logic expression to draw the logical product of the inversion of the drawn bit S and the bit D, and the register MOD1 sets a logic expression to draw the logic sum of the bit S and the bit D. In this case, it is assumed that in the initial state, the plane memory is perfectly cleared to "0", and "1" is set in the bit S to be drawn.

Figure 6A:
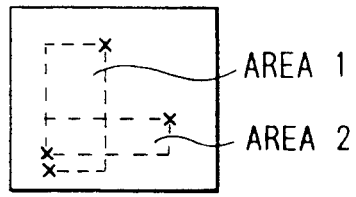
Figure 6B:
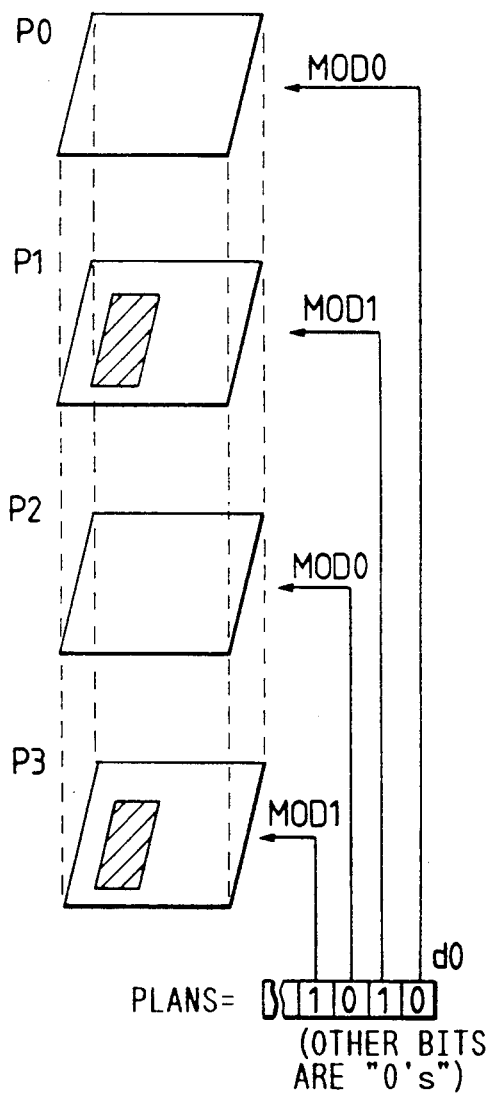
Figure 6C:
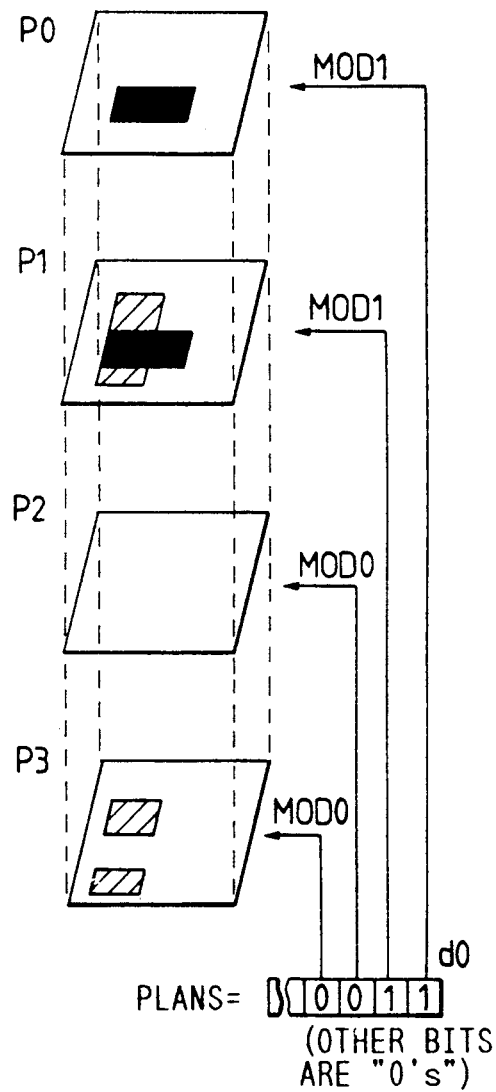

When the coloring command is executed according to the logic expression, the later-designation precedence is set up. As shown in FIG. 6(a), for example, the areas are designated in the order of area 1 → area 2. The area 1 is drawn by '1010", and then the area 2 is drawn by "001". In this case, the drawing of the area 2 as shown in FIG. 6(c) is prior to the drawing of the area 1 shown in FIG. 6(b).

(D) Coloring Processing

FIG. 7 shows explanatory diagrams showing the coloring of a marker designated area. FIG. 8 shows explanatory diagram for explaining the coloring of an in-frame area. FIG. 9 shows explanatory diagrams for explaining the coloring of a rectangular area.

In the coloring processing, for the marker edit and the in-frame coloring edit, the marker scan and the closed area scan are performed as the prescans. In the marker scan and the closed area scan, the image data read by the IIT must be transferred to the plane memory. In the data transfer to the plane memory, the coordinates value of the plane memory is set to the registers X, Y, DH, and DV. "DMAWR" is set for the control register CTRL of the DMC, the PUTC command is set, "READY" is transferred to the SYS, and "DMAWR" is removed after the prescan.

Figure 7A:
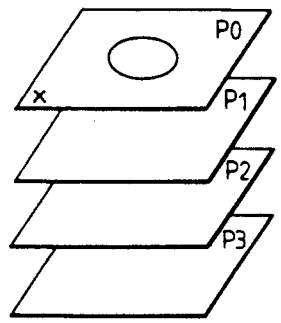

In the coloring processing, after the marker scan terminates, when a marker area is drawn as shown in FIG. 7(a), the clipped area is removed, the registers X and Y are cleared to "0" the register PLANS is set for the plane memory P0, the register PTNCNT is set to an overall paint pattern ($FF_R$) by "1", and a closed-area paint command P is set. Subsequently, a drawing processor starts a drawing processing. Control monitors "DRAWING PROCESSOR BUSY" in the bit 2 of the register STATUS every 10 msec, and waits till the drawing processing by the drawing processor ends, and it becomes "NOT BUSY".

Then, the registers X and Y are set to 0, the register to 1200, and DY to 1728. As a result, the entire plane of the plane memory is designated as a rectangular area. A paint pattern is set in the register PTCCNT. An exclusive OR ($04_H$), as the type of the logic operation, is set in the register MOD1. A paint command for painting a rectangular area (the entire area of the plane memory P0) as indicated by the registers X, Y, DX, and DY, is set. Subsequently, control monitors every 10 minutes "DRAWING PROCESSOR BUSY" in the bit 2 of the register STATUS, and waits till "NOT BUSY" is set therein.

Figure 7B:
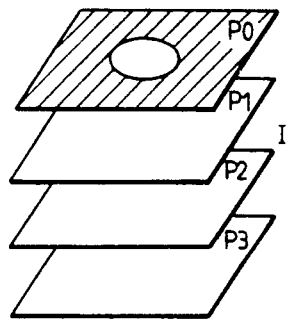
Figure 7C:
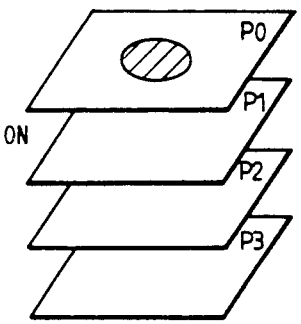

In this way, the area outside the marker area in the plane memory after the marker scan completes as shown in FIG. 7(a), is painted as shown in FIG. 7(b). Succeedingly, it is inverted, so that the marker area is colored as shown in FIG. 7(c). In the marker scan mode, only the marker is changed in color into black, while the remaining portion is changed into white. As a result, only the marker is drawn as image data in the plane memory, as shown in FIG. 7(a).

In the in-frame coloring edit, after the closed area scan mode terminates, the register PLANS is set, a paint pattern for the all-over paint with "1's" is set in the register PTNCNT, closed area designating coordinates are set in the registers X and Y, and a command PAINT is set. Subsequently, control monitors every 10 minutes "DRAWING PROCESSOR BUSY" in the bit 2 of the register STATUS, and waits till "NOT BUSY" is set therein, and returns "READY" to the SYS.

Figure 8A:
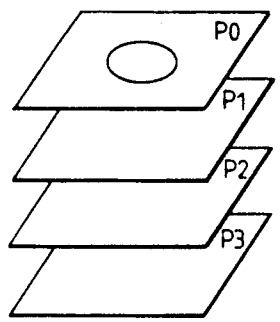
FIGS. 8a–8b explanatory diagram for explaining the coloring of an in-frame area.
Figure 8B:
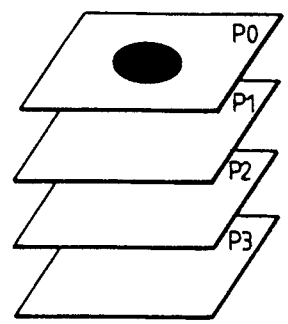

In this way, a document image as gathered by the closed area scan as shown in FIG. 8(a) is stored into the plane memory. The closed area in the memory is colored as shown in FIG. 8(b).

In the rectangular area edit, the register PLANS is set, a paint pattern for the all-over paint with "1's" is set in the register PTNCNT, closed area designating coordinates are set in the registers X and Y, DX, and DY, and a command RRECFIL is set. Subsequently, control monitors every 10 minutes "DRAWING PROCESSOR BUSY" in the bit 2 of the register STATUS, and waits till "NOT BUSY" is set therein. When the "extract" is selected, it is inverted and is returned to the SYS.

Figure 9A:
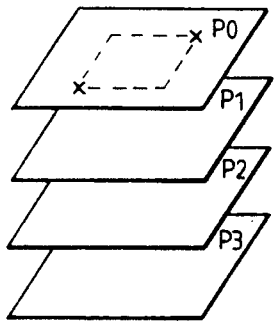
Figure 9B:
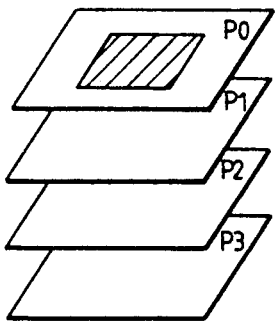
Figure 9C:
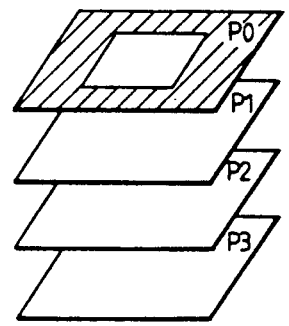

In this way, the rectangular area of the designated coordinates values as shown in FIG. 9(a) is colored as shown in FIG. 9(b). In the case of the "extraction", it is inverted as shown in FIG. 9(c).

In the case of the free-shape area, an area depicted by a user in a free hand manner is recognized by a digitizer. A required edit processing is applied to the area. Four types of edits are allowed; coloring, mask, trim, and black- to-color conversion.

In the processing, the coordinates data is picked up by the and is delivered from the UI to the processor, and is stored in the memory of the VCPU. In this case, if a user first designates the coordinates P0, then P1, P2, . . . , and finally P6, then the free-shape area start coordinates P0, free-shape area interim coordinates P1, . . . , the free-shape area final coordinates P6, and the free-shape area coloring start coordinates P7 are sent from the UI to the VCPU. Finally, the data indicating that the coordinates input operation ends is set.

Meanwhile, the setting procedure for the AGDC is performed in the following manner, according to the data stored in the memory of the VCPU.

The plane memories including the work planes are first cleared. The start area coordinates P0 is set in the AGDC, and the interim area coordinates P1 is set. The coordinates P0 and P1 are connected to each other. Succeedingly, the coordinates P2 is set and the coordinates P1 d P2 are connected to each other. This operation is repeated till the final area coordinates P6. Incidentally, in setting the coordinates data in the AGDC, the product of multiplying the coordinates data and a factor is used. Next, the coloring start coordinates P7 is set, and a command PAINT is set. Subsequently, control monitors every 10 minutes "DRAWING PROCESSOR BUSY" in the bit 2 of the register STATUS, and waits till "NOT BUSY" is set therein.

(E) Pattern Setting Mode

In the pattern setting mode, according to the edit selected, e.g., trim, mask, or paint edit, only the annotation is outputted to the register FIL-PTN-REG-1, with the solid pattern. In the mesh edits, the background is colored according to a selected pattern. In the in-frame coloring edit, the background is colored with a solid pattern. In the color conversion edit, the foreground is colored with a solid pattern.

(II-4) DMC

FIG. 10 shows a circuit arrangement of the DMC (DMA controller). FIG. 11 shows the data transfer lines between the IRE (image reduction and enlargement controller) and the AGDC (advanced graphic data controller).

(A) Outline

Figure 10A:
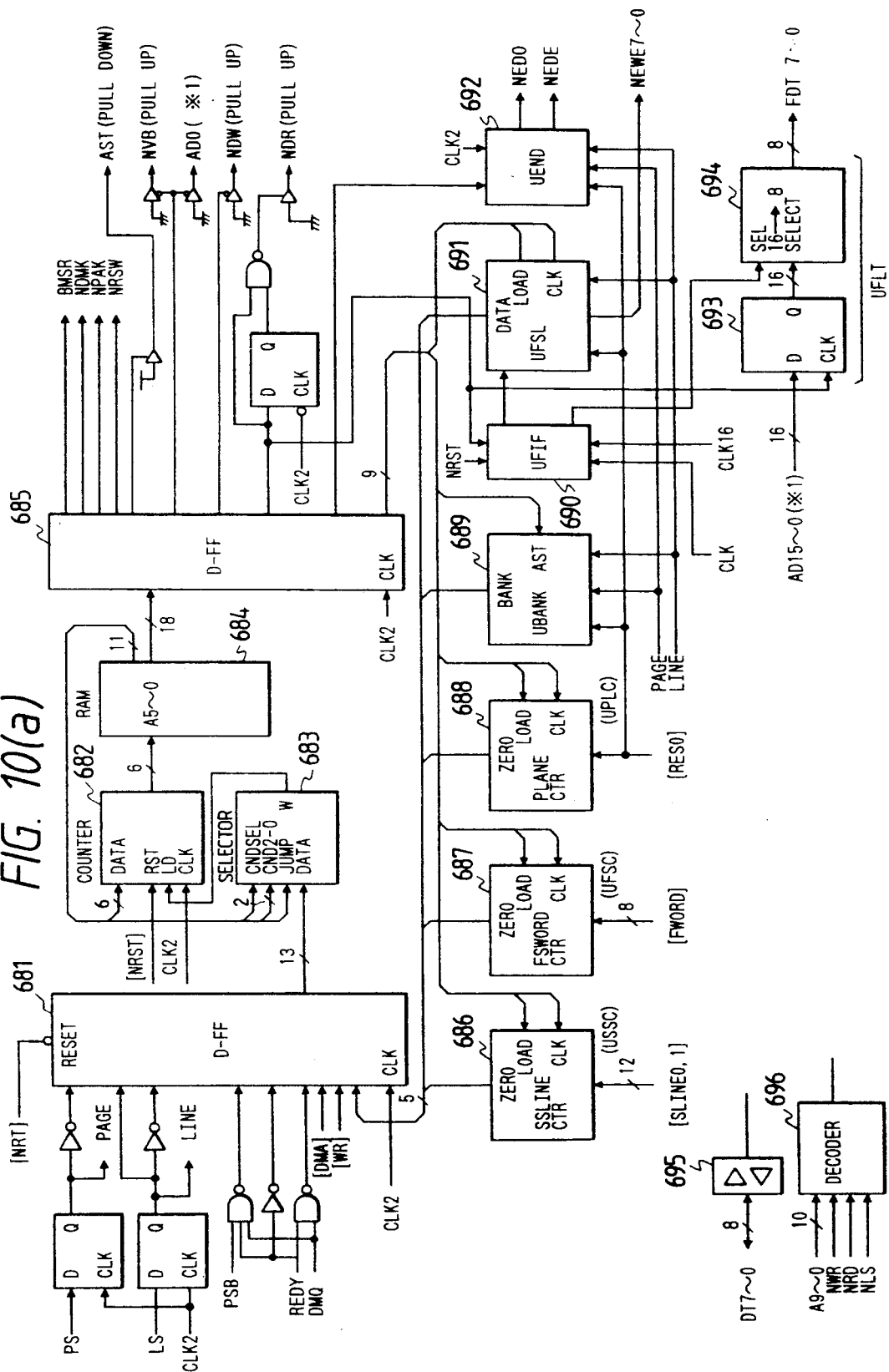
FIGS. 10a–10b shows circuit arrangement of the DMC (DMA controller)

In the DMC, data is transferred from the IRE to the AGDC in response to a DMA write/put command. In response to a DMA read/get command, data is transferred from the AGDC to the FIFO, by way of the FIFO interposed therebetween. The data transfer from the IRE to the AGDC is performed, with the data of one plane as the data unit. The data transfer from the AGDC to the IRE is performed, with the data of four planes as the data unit.

designated by single reference numeral 697, and an 8→1 multiplexer 698 corresponds to the sector portion 683 shown in FIG. 10(a). The combination of a 6-bit selector, a 6-bit FF, and a +1 increment circuit corresponds to the counter portion 682. An input SEL to the 6-bit selector corresponds to the LD of the counter portion 382 shown in FIG. 10(a). The input data to the selector portion 683 in FIG. 10(a) consists of 13 bits. The input data to the 8-bit selector consists of 16 bits. Of those 16 bits of the input data, 2 bits are used for "pull up" and 1 bit for "pull down", shown in the following table, and hence the conditional input data consists of 13 bits.

| CND2 | CND1 | CND0 | CNDSEL=0 | CNDSEL=0 |
|------|------|------|----------|----------|
| 0 | 0 | 0 | PULL UP | PULL UP |
| 0 | 0 | 1 | DMA = "L" | DMQ.READY=L |
| 0 | 1 | 0 | PS = "L" | 687 ≠ "0" |
| 0 | 1 | 1 | WRx = "H" | 686 = "0" |
| 1 | 0 | 0 | LS = "L" | 688 = "0" |
| 1 | 0 | 1 | LS = "H" | 689 = "0" |
| 1 | 1 | 0 | DMQ.READY.PSB=L | 691 = "0" |
| 1 | 1 | 1 | READY = "L" | PULL DOWN |

The DMC is made up of a control register DMC-CTR-REG-n (n =0 to 3), a register DMC-FWORD-REG-n (0 to 7) in which the number of words as viewed in the main scan direction is set, and a register DMC-SLINE0-REG-n (8 low-order bits) and a register DMC-SLINE1-REG-n (4 low-order bits) in which the number of lines as viewed in the vertical scan direction). The registers are accessible from the VCPU. By a power only set, "0" is set in the control register DMC-CTR-REG-3. The contents in the remaining registers are indefinite at the time of power on. The contents of the register are replaced with new data during a period that after the page sink PS becomes deactive, ten clocks elapse, and four clocks before the page sink PS becomes deactive again. At the time of power on, writing of data into the RAM and the three registers other than the control register DMC-CTR-REG is completed, and then data is written into the control register DMC-CTR-REG.

The data set in the control register DMC-CTR-REG consists of a RESO bit for designating either the reduction of 8 dots/mm or the reduction of 4 dots/mm, a bit for setting up a DMA write mode to transfer data from the IRE to the AGDC in the prescan mode and a DMA read mode for transferring data from the AGDC to the IRE, a DMA bit for setting a DMA stop and a DMA start, and an NRT bit for setting a reset or a normal operation.

(B) Circuit Arrangement

The DMC is arranged so as to asynchronously latch and process the data by using latch circuits 681 and 685. The latch circuit 681 is used for sampling a signal from an exterior and the output signals of various types of counters (e.g., SSLINE counter 686) by a clock. Another latch circuit 685 is used for synchronizing a memory output signal with a clock when the memory output signal is outputted to external and internal counters, for example. A memory 684 has a 36-bit width, and of those bits, the 29 upper order bits are used. When the reset register DMC-CTR- REG-3 contains "0", the memory address is fixed to "0". A counter portion 682, a selector portion 683, and the memory (RAM) 684 make up a sequencer. The details of the circuit arrangement is shown in FIG. 10(b).

Figure 10B:
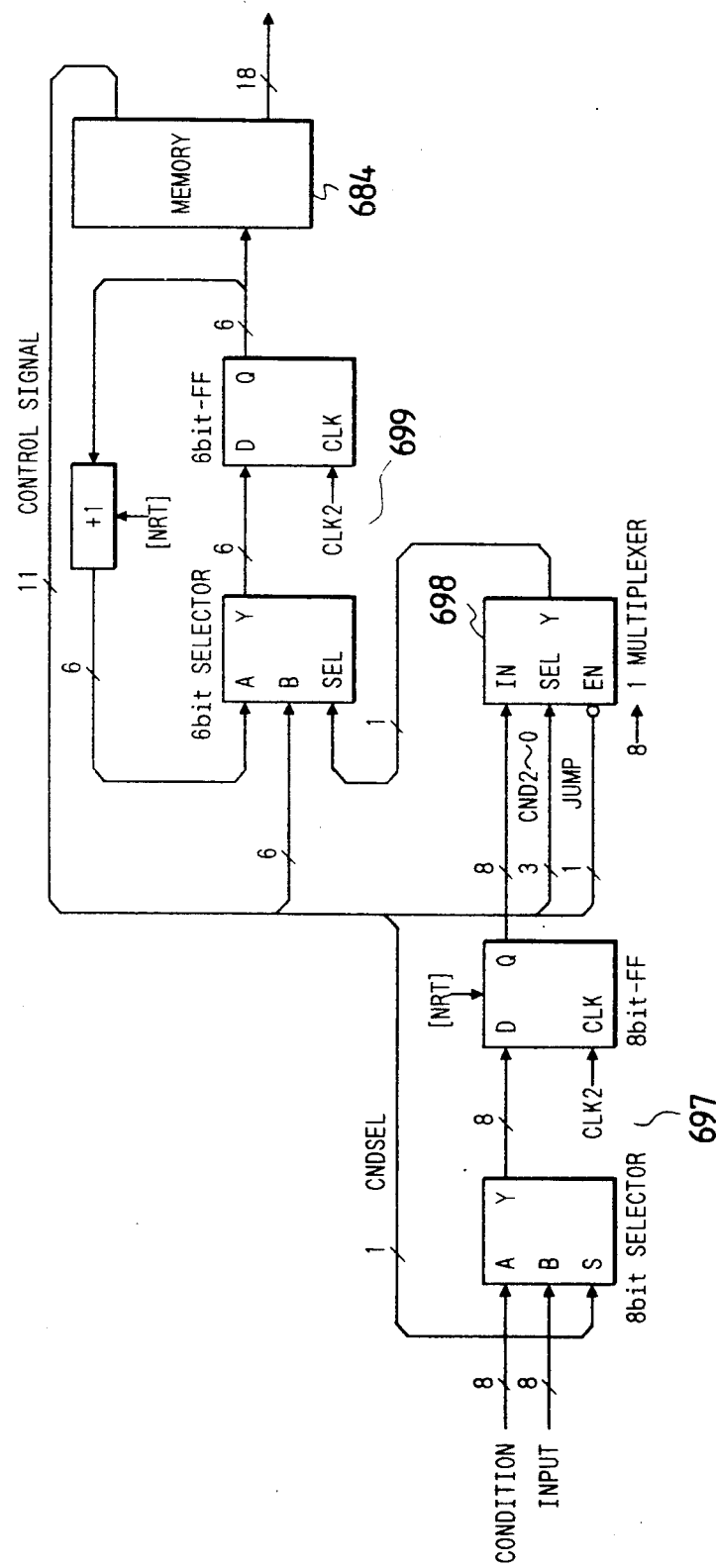

In the sequencer shown in FIG. 10(b), the combination of an 8-bit selector and an 8-bit FF, both being The "pull up" is needed for the unconditional jum. Therefore, the selector may be designed to have a select range from 14 bits to 1 bit, since 13 bits for conditional input +1 bit for pull up. The selector thus designed, however, is slow in operation speed. To avoid this, within one clock prior to the conditional jump, 16→9 bit select is done by a signal CNDSEL. At the actual conditional jump, the 8→1 multiplexer selects one condition by the bits COND2 to COND0. Thus, the necessary condition input data is selected by a total of four bits CNDSEL and CND2 to CND0.

The counter portion 682 usually counts up every clock. At this time, the 6-bit selector selects the input A, the 6- bit FF delays it by one clock, and the +1 increment circuit increments it by one. In this way, the data is returned to the input of the 6-bit FF, and then the data is incremented by one every clock at the input of the memory 684.

Since the memory 684 stores a microprogram, it produces an instruction according to an address as indicated by the counter. In this instruction, the conditional jump is made by the 11 upper order bits. In this case, within one clock prior to the conditional jump, the bit CNDSEL is determined, and in the conditional jump, the jump control is executed by a total of ten bits JUMP, CND2 to 0, and JA5 to 0. The JUMP is a signal to determine whether or not the conditional jump is done. When this bit is "0", the jump is not done, the output signal of the 8→1 multiplexer is forced to be "0", and the 6-bit select selects the input A. At this time, the input data to the memory 694 has been counted up by one. When the JUMP bit is "1", the conditional jump is done.

When the conditional input as selected by the CNDSEL and CND2 to CND0 is true, it is "1", so that the 6-bit selector selects the input B. The input B is JA5 to JA0 in the memory, which indicate an address to which the program jumps. When the conditional input is untrue, the output data of the multiplexer is "0". As in the case where the JUMP is "1", the data counted up by one is inputted to the memory.

As described above, the conditional input data of the sequencer portion consists of 16 bits. In the 16→1 multiplexer, the operation speed is not enough in the conditional jump mode. To cope with this, the data is passed through the 8-bit selector within one clock prior to the conditional jump. Thereafter, it is passed through the 8→1 multiplexer.

A WORD counter 687 is a counter of 8-bit long which counts the number of words in the DMA transfer mode, and receives data from a register DMC-FSWORD-REG. A LINE counter 686 is a down counter of 12 bits wide which counts the number of lines in the DMA transfer mode, and receives data from registers DMC-SSLINE0-REG and DMC-SSLINE1-REG. a plane counter 688 is a down counter of 2 bits wide which counts the number of planes in the READ transfer mode, and receives data of "1" when "0" is set in the register DMC- CTR-REG-0 (RESOO), and the data of "3" when the (RESO) is "1". A load signal and a count pulse are supplied from the sequencer, and the output signal of each of those counter becomes "H" (high) in logic level.

A UBANK 689 frequency divides the line to time the selection of the FIFOs in the read transfer mode. When the RESO is "0", the output signal of it becomes high every two lines. When the RESO is "1", the output signal becomes high every 4 lines. And the reset signal from the sequencer becomes "0" again.

A UEND 692 frequency divides the line to form FIFO read enable signals NGDO and NGDE in the read transfer mode. This circuit can be reset by the sequencer, and is reset within four clocks after the page sink PS falls.

A FIFO control portion is made up of a UFIF690, UFSL691, and UFLTs 693 and 694, is operable only in the read transfer mode. A FIFO write reset signal NRSW is outputted from the sequencer, and all of the FIFOs are reset every time data is loaded to the word counter. The selection of the FIFOs is made by a counter UFSL 691. The counter is counted up two by two when receiving a count pulse supplied from the sequencer. The load data is designed as shown in the following table in a hardware manner, and a load signal is supplied from the sequencer.

| DATA | CONDITION | |
|---|---|---|
|  | RESO = 0 | RESO = 1 |
| 1 | WHEN COUNT = 2 | WHEN COUNT = 8 |
| 0 | WHEN COUNT ≠ 2 | WHEN COUNT ≠ 8 |

The FIFO write data is latched in the UFLT portion, and divided into the 8 high-order bits and the 8 low-order bits. At this time, a select signal is formed by a UFIF.

(C) Data Transfer Mode

The data transfer mode will be described.

Figure 11A:
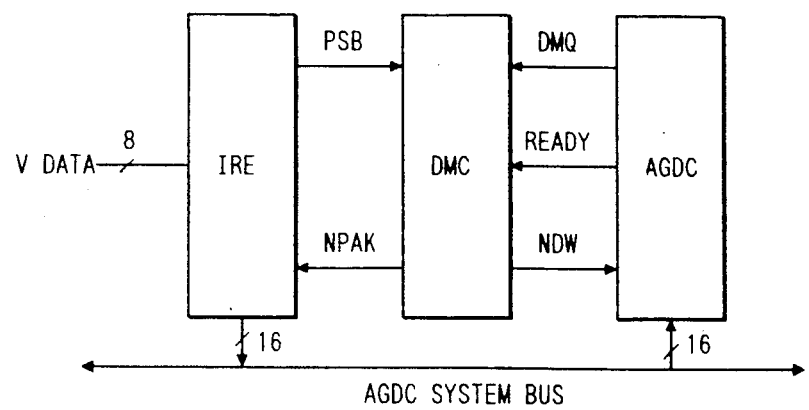
FIG. 11a–11b show data transfer lines between the IRE and the AGDC.

The data transfer from the IRE (image reduction and enlargement controller) to the AGDC (advanced graphic data controller), is performed by utilizing lines shown in FIG. 11(a) in the following manner.

(1) The IRE binarizes image data, and reduces the size of the image from 16 dots/mm to 4 dots/mm, thereby packing the data into 16 pixels (16 dots).

(2) The IRE renders a put strobe signal PSB high when a state ready for data transfer is.set up. When receiving the strobe signal, the DMC renders a DMA write signal NDW "L" (low), and transfers a signal representative of "write start" to the AGDC. Thereafter, the AGDC renders the READY low. The DMC also renders a put acknowledge signal NPAK low.

(3) The IRE sends data on a system bus of the AGDC when the put acknowledge signal NPACK goes low in logic level.

(4) The AGDC makes the READY high when it is placed in such a state that it can fetch the data on the system bus. Then, the DMC makes the DMA write signal NDW high. At the leading edge of the DMA write signal NDW, the AGDC fetches the data.

The above sequence of operations is repeated to transfer data from the IRE to the AGDC.

Figure 11B:
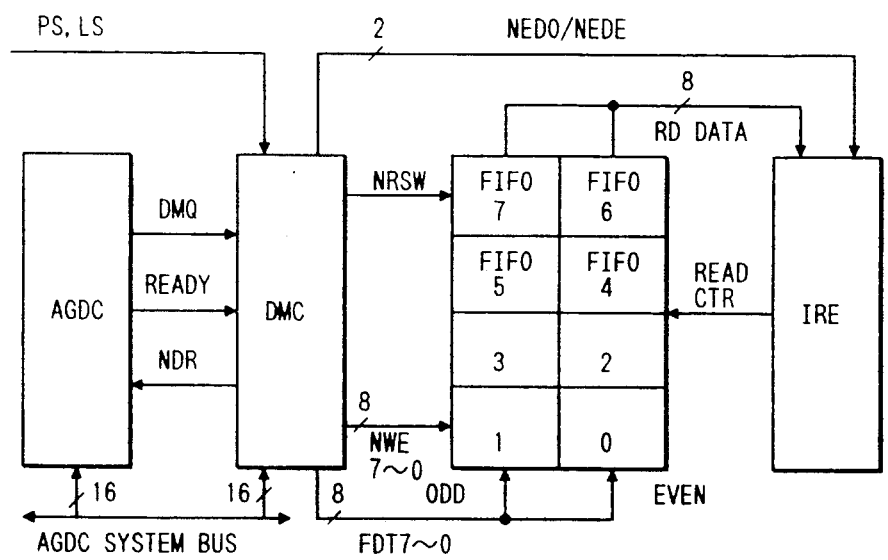

The data transfer from the AGDC to the IRE in the main scan mode is performed by using the lines shown in FIG. 11(b) in the following way.

(1) When a DMA request signal DMQ of the AGDC and the READY are both "H" (high) in logic level, the DMC renders a DMA read signal NDR "L" (low), and transfers a read start signal to the AGDC. Then, the AGDC renders the READY low.

(2) The AGDC sends read data on the system bus, and then renders the READY high.

(3) When the READY goes high, the DMC fetches the data on the system bus, and loads it into the FIFO forming a double buffer (EVEN, ODD) in the order of the 8 high-order bits and the 8 low-order bits) , and renders the DMA read signal NDR high.

(3) The DMC progressively writes the data of the four memory planes in the AGDC into the FIFO on the one-plane one-line basis.

(5) When data has been stored into the four FIFOs (of one bank), the DMC renders an AGDC get end ODD signal NEDO or an AGDC get end EVEN signal NEDE low, to transfer a ready-for-FIFO read signal to the IRE.

(6) The DMC transfers data from the AGDC to another FIFO, which is not read by the IRE.

The above sequence of operations is repeated to transfer data from the AGDC to the IRE.

(II-5) IRE

Figure 12:
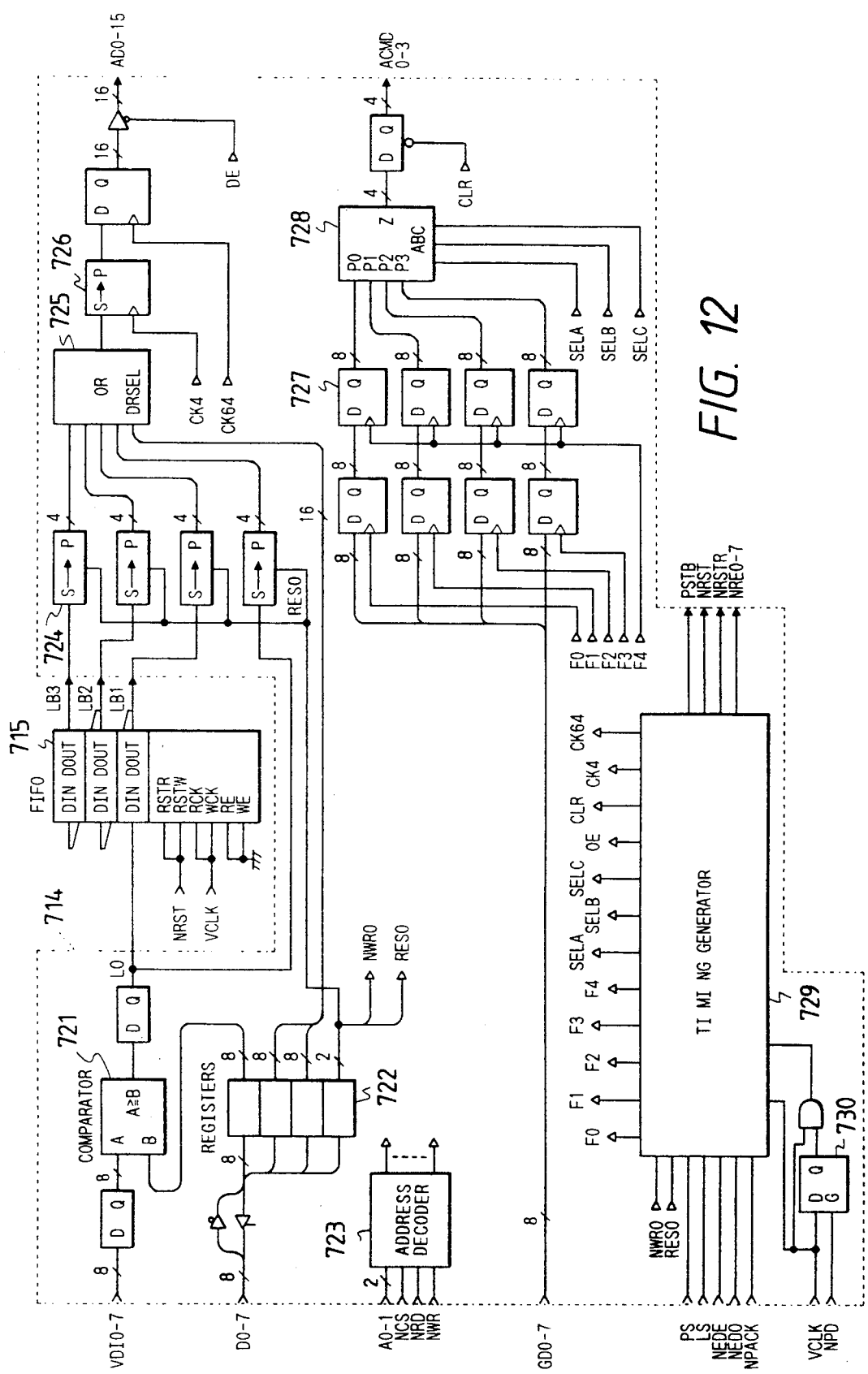
FIG. 12 is a block diagram showing the IRE (image reduction and enlargement controller)
Figure 13A:
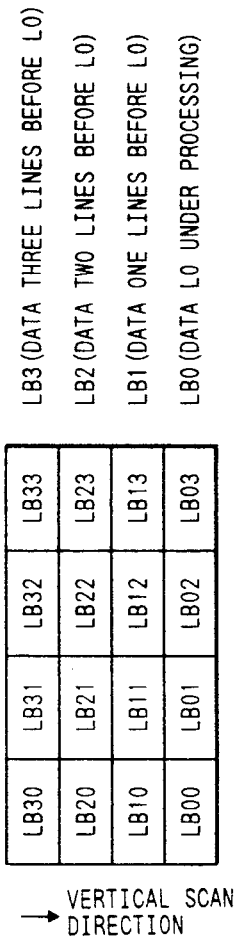
FIG. 13a–13c show diagrams showing an arrangement of an S/P (serial to parallel) converter.
Figure 13B:
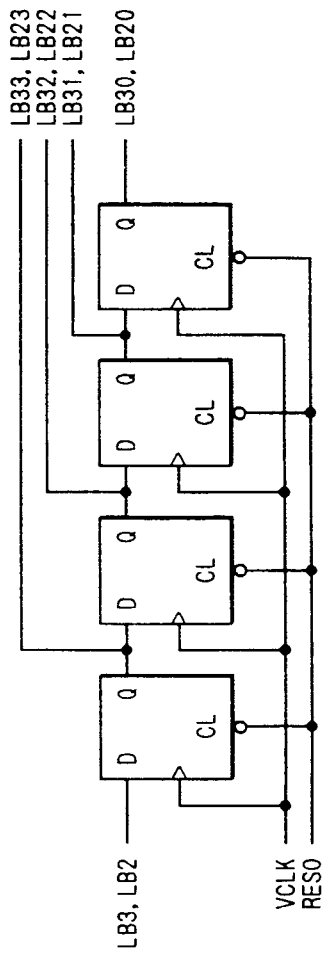
Figure 13C:
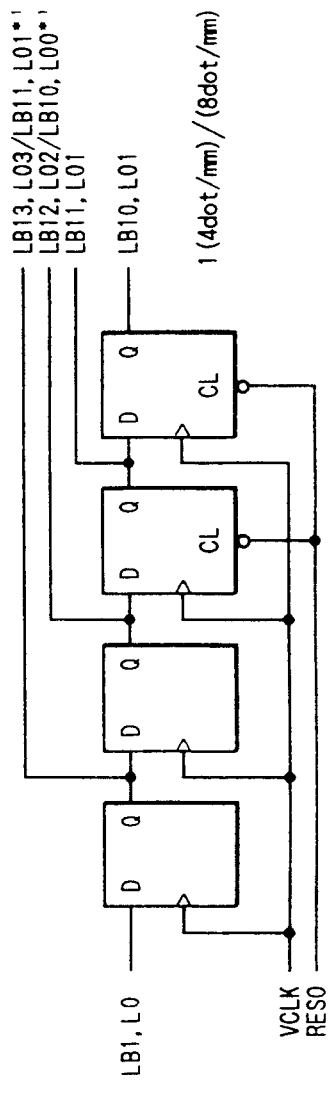
Figure 14:
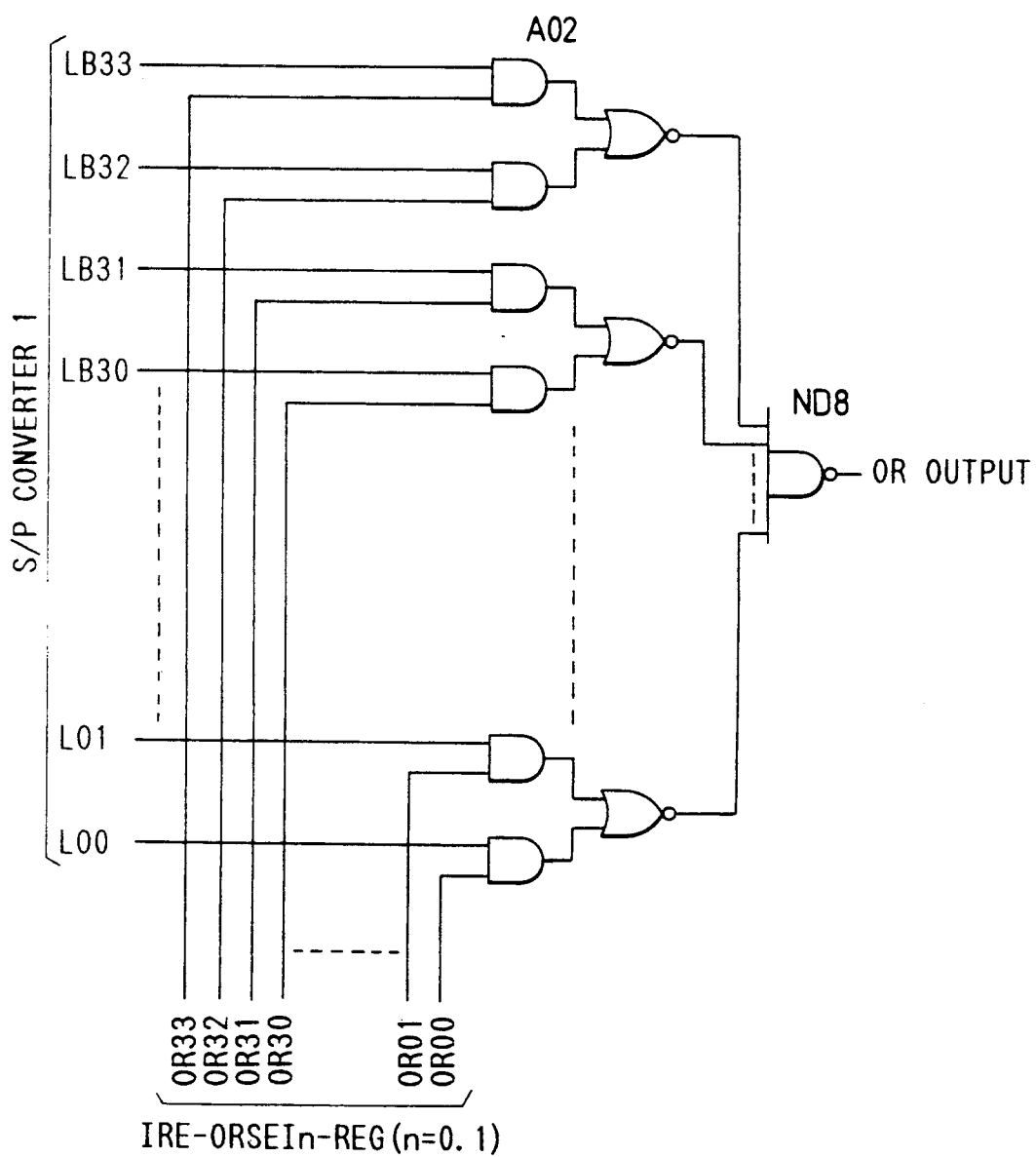
FIG. 14 is a circuit diagram showing an OR circuit.
Figure 15:
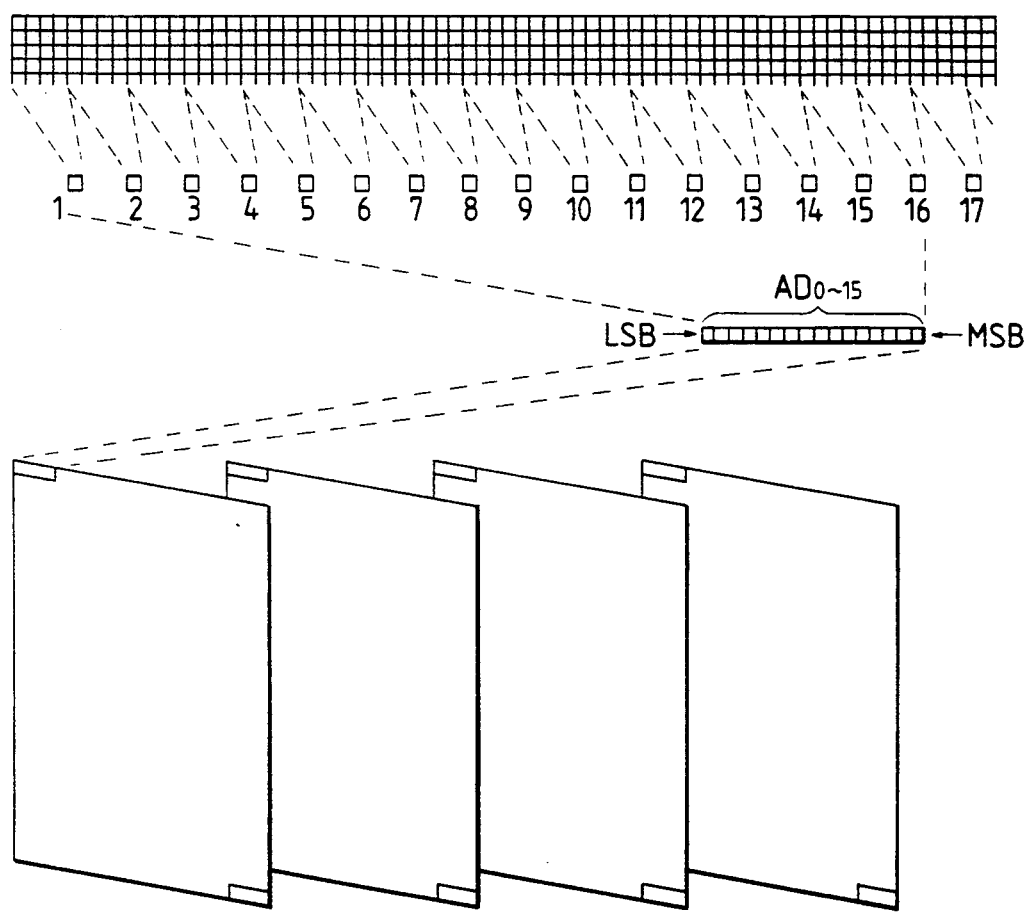
FIG. 15 is a diagram useful in explaining data transfer from the IRE to the AGDC.
Figure 16:
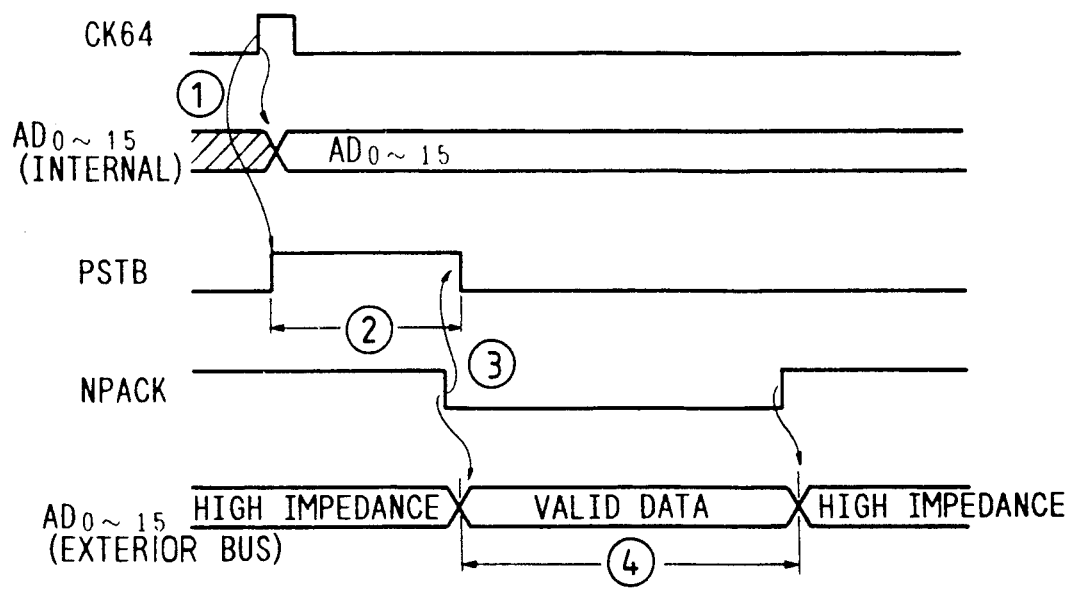
FIG. 16 is a timing chart showing an output control in a timing generator.
Figure 17:
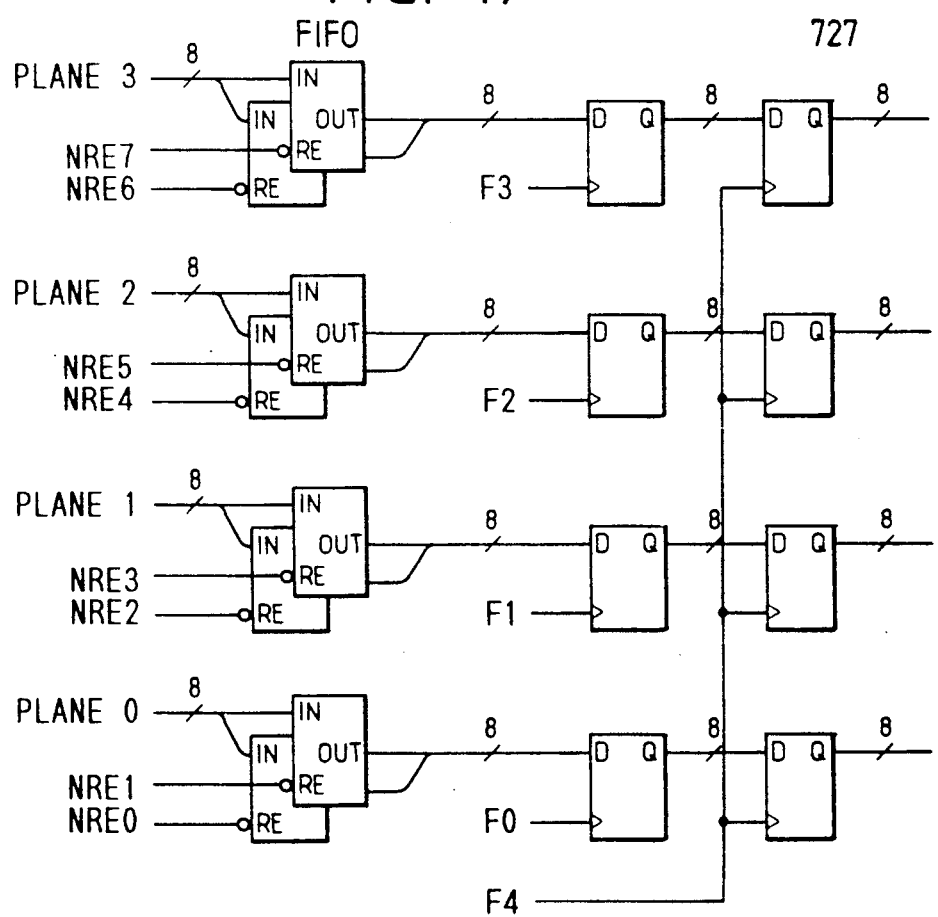
FIG. 17 is a block diagram showing an arrangement of a FIFO read circuit.
Figure 19:
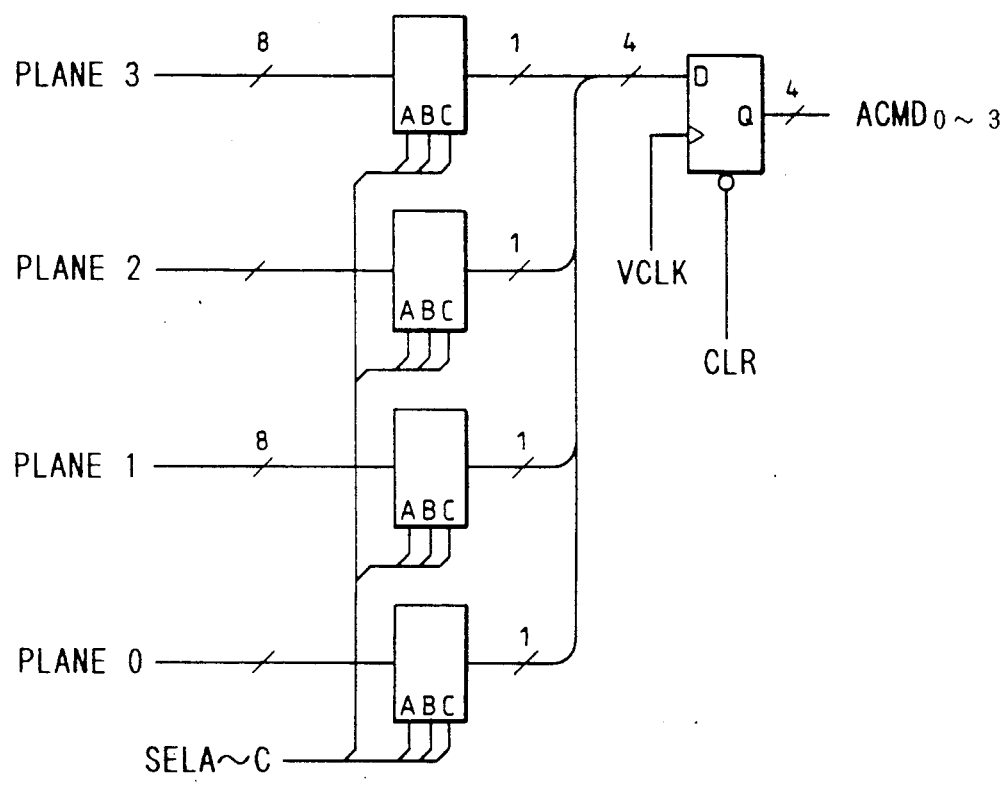
FIG. 19 is a block diagram showing an arrangement of a multiplexer circuit.

FIG. 12 is a block diagram showing the IRE (image reduction and enlargement controller). FIG. 13 shows diagrams showing an arrangement of an S/P (serial to parallel) converter. FIG. 14 is a circuit diagram showing an OR circuit. FIG. 15 is a diagram useful in explaining data transfer from the IRE to the AGDC. FIG. 16 is a timing chart showing an output control in a timing generator. FIG. 17 is a block diagram showing an arrangement of a FIFO read circuit. FIGS. 18 and 20 are diagrams showing flows of FIFO read data. FIG. 19 is a block diagram showing an arrangement of a multiplexer circuit.

As recalled, in the present invention, an edit area is written into the plane memory 704. Then, an edit command is drawn in the edit area. In the annotation processing, the edit command is read out of the plane memory 704 in synchronism with the image data in the main scan mode. While image data is read at a resolution 16 dots/mm, a resolution of the plane memory 704 is set at 4 dots/mm, which is lower than that of the image data. For this reason, to write the image data within the edit area, which is read by the prescan, into the plane memory 704, some processing must be applied to the image data.

The LSI of the IRE is provided mainly for making conversion and adjustment of the image data to cope with the resolution difference between the image data and the plane memory 704. The conversion/adjustment processing is performed in such a way that in writing the edit area as is obtained from the image data in the prescan, into the plane memory 704, the image data is binarized to pick up the area data from the image data, the binarized data is reduced and then is transferred to the AGDC 701. In this way, the edit area can be written into the plane memory 704, at the resolution of that of the plane memory. In reading an edit command, the AGDC 701 enlarges the edit command read out of the plane memory 7-04, and outputs the enlarged one. As a result, the resolution of the image data, which is read out of the plane memory 704, can be converted into the original one.

The conversion/adjustment processing as just mentioned is implemented into a circuit arrangement as shown in FIG. 12.

(A) Registers and Set Data

A register group 722, which is always accessible from the VCPU, includes a register for setting select data (ORSEL) for an OR circuit 725, a register for setting threshold data for the reduction and enlargement, and a register for setting control data. The select data for the OR circuit 725 sets whether or not the binary data of a designated 4×4 matrix is inputted to the OR circuit 725. A total of 16 bits, 4 bits for the main scan direction and 4 bits for the vertical scan direction, are individually set. A matrix for the resolution reduction is: a matrix of 4×4 for the reduction 16 dots/mm→4 dots/mm, and a matrix of 2×2 for the reduction 16 dots/mm→8 dots/mm. As recalled, the plane memory 704 has the resolution of 4 dots/mm. Therefore, to write the image data into the memory plane 704, the resolution must be reduced from "16 dots/mm" to "4 dots/mm". To read the data from the memory, the resolution must be enlarged. For the reduction and enlargement, a matrix is used. The arrangement shown in FIG. 12 is designed so as to be able to reduce the resolution reduction up to 8 dots/mm, and in this sense, is more versatile. For the reduction to 4 dots/mm, for example, the 4×4 matrix produces one-dot data, and for the reduction to 8 dots/mm, the 2×2 matrix produces one-dot data.

The threshold select data for the reduction and enlargement is the threshold used when the input image data is binarized, and is expressed as an absolute value of 8 bits.

The control data includes the data (RESO) for setting either of the reduction resolutions, 16 dots/mm→8 dots/mm and 16 dots/mm to 4 dots/mm, and select data (NWR0) to select reduction or enlargement. As already described, in the prescan mode in which the data is outputted to the DMC (DMA controller) 706, the reduction processing is executed in order to match the resolution with that of the plane memory 704. In the main scan mode in which the data is transferred from the FIFO 707 to the AGDC, the enlargement processing is executed for enlarging the resolution to the original one. Then, it is set according to the timing.

(B) Processing Circuit in the Prescan Mode

A processing circuit used in the prescan mode is made up of a comparator 721 for binarizing image data, the S/P converter 724 for reducing 4-line data of 4×4 dots and the OR circuit 725, and an S/P converter 726 for rearranging the reduced image data into 16-bit wide data.

A comparator 721, which forms a binarizing circuit, binarizes input image data VDI0 to VDI7 by comparing that image data with the threshold data. The threshold value is set in the register group 722. The binary data is transferred to the FIFO 715. Since data of four lines including input data is applied to the next S/P converter 724, the FIFO 715 retains the binary data of three lines.

The S/P converter 724 prepares a matrix for matching the resolution of the binary data with a reduction resolution. The converter 724 fetches binary data of four lines as the sum of the output data of the comparator 721 and the binary data of three lines stored in the FIFO 715, and prepares a matrix for matching the resolution of the data with the reduction resolution. In a matrix of 4×4 arrayed in the main and vertical scan directions, which consists of data LB30 to LB33, LB20 to LB23, LB10 to LB13, and LB00 to LB03, as shown in FIG. 13(a), to gain the reduction resolution of 16 dots/mm→8 dots/mm, the data LB10, LB11, LB00, and LB01 make up a matrix. Accordingly, for the reduction to 4 dots/mm, four serial to parallel converters of 1 bit→4 bits are used. In the reduction to 8 dots/mm, the data LB3, LB2, and LB12, LB13, LB02, and LB01 are not required. A measure must be taken for preventing the data not used from influencing the succeeding OR circuit 725. To this end, a hardware as shown in FIGS. 13(b) and 13(c) is used in the instant embodiment.

The OR circuit 725 ORs the binary image data according to a reduction resolution by a gate circuit shown in FIG. 14. When the respective bits OR0 to OR33 of the select data ORSEL which are stored in the registers are all "1's", if any one of data L00 to L33 which come from the S/P converter 724 is "1", any one of AND circuits produces a signal of "1", and hence the OR output signal is "1". As the result of setting the select data ORSEL, where the reduction resolution is 4 dots/mm, for example, the output data of the 4×4 or 3×3 matrix is OR-ed, and hence the binary image data of 16 dots are OR-ed. In the case of 8 dots/mm, the output data of the 2×2 matrix are OR-ed, and then the binary image data of 4 dots wide are OR-ed.

The S-P converter 726, which is for the 1 bit→16 bits conversion, arranges the data into 16-bit-wide data in order that the output data of the OR g ate 725 is transferred through the DMC 706 to the AGDC 701. To reduce the resolution to 4 dots/mm, for example, the clock used for the 1 bit→16 bits conversion, as shown in FIG. 15, is a period of 4 video clocks VCLK. The clock used for arranging OR data into 16-bit-wide data is a period of 64 video clocks VCLK. Similarly, to reduce the resolution to 8 dots/mm, the clock used for the 1 bit →16 bits conversion is a period of 2 video clocks VCLK. The clock used for arranging OR data into 16-bit-wide data is a period of 32 video clocks VCLK.

In the thus-arranged processing circuit in the prescan mode, the comparator 721 first compares the image data with the threshold value, thereby to binarize the image data. The data of 4 lines, which includes the data of 3 lines stored in the FIFO 715, is inputted to the S/P converter 724. The binary image data each of four bits are derived in parallel fashion from the S/P converter 724. The 4×4 image data is reduced by the OR circuit 725. In the OR circuit, of the 4×4 image data, the 3×3 image data designated by the register are OR-ed. If any one of the 3×3 image data contains "1", that is, if the image data of 3×3 dots is selected as object data from the image data of 4×4 dots, and any one of the object data contains "1", the image data of 4×4 dots is reduced to the one-dot image data of "1". In this way, the image data of 16 dots/mm is reduced to the image data of 4 dots/mm. After the image data is reduced by the OR circuit 725, the reduced data is arranged into 16- wide data, as shown in FIG. 15, by the S/P converter 726, and is transferred to the AGDC 701.

(C) Processing Circuit in the Main Scan Mode

A processing circuit in the main scan mode is made up of a FIFO read circuit 727 and a multiplxer 728.

The FIFO read circuit 727 reads 4-plane area data, which has been stored into the FIFO 707 by the DMC 706, from the FIFO. The area data is written into the FIFO 707 on the basis of one plane for one FIFO. The FIFO 707 is of the double buffer structure. Since the data bus GD0 to GD7 is 8 bits wide, it is impossible to read the data of four planes simultaneously. Therefore, the FIFO 707 is selected by the FIFO read circuit 727 shown in FIG. 17, to read the data of four planes.

In the read operation, by a signal NEDE/NEDO of the DMC 706, a bank to be read is determined, and during a period that the signal NEDE/NEDO is active, the FIFO 707 is selected by signals NRE0 to NRE7. The read data from the FIFO 707 are latched by timing signals F1 to F3. As shown in FIG. 18, when the data of four planes is completed, the data of 4 planes are latched together in the succeeding latch circuit, and then outputted to the multiplexer 728.

For the FIFO read clock, the video clock VCLK is used. Accordingly, a period that signals NRE0 to NRE7 are active, is assigned to one video clock VCLK. An interval is placed between a period that the signals NRE0 to NRE7 are active and a period that those become active again. With this, the data of different planes will never collide with each other on the data bus.

The multiplexer 728 converts the data format from the plane type to the pixel type, and output the data of 16 dots/mm. The multiplexer 728 is made up of four 8 to 1 multiplexers as shown in FIG. 19. The area data written from the AGDC 701 into the FIFO 707, is 4-plane data. Where the reduction resolution is 4 dots/mm, all of the four bits of the area command data are treated as valid data, and is enlarged into four times as large as four bits, 16 dots/mm. In case where the reduction resolution is 8 dots/mm, the area data written from the AGDC 701 to FIFO 707 2-plane or 1-plane data. In this case, the valid area command data consists of 2 bits for the 2-plane data, and 1 bit for the 1-plane data.

In the thus arranged processing circuit in the main scan mode, the image data is transferred from the AGDC 701 and written into the FIFO 707 in synchronism with the read of the image data. The image data of four planes is read out of the FIFO 707 by the FIFO read circuit 727. The data is enlarged into the data of 16 dots/mm by the multiplexer 728, which in turn is transferred to the FAC 716.

(D) Timing Generator A timing generator 729 controls the reduction and enlargement processing, transfer of data through the DMC 706 to the AGDC 701, and the reading of the area data of four planes, which has been written into the FIFO 707 by the DMC 706. The transfer of data through the DMC 706 to the AGDC 701 is timed as shown in FIG. 16. As shown, when the data of 16 bits is completed, a signal PSTB is made active and transferred to the DMC 706. When a signal NPACK from the DMC 706 becomes active, the signal PSTB is made inactive. During a period that the signal NPACK is active, the data AD0 to AD15 is outputted onto the bus. This is done every 4 lines when the reduction resolution is 4 dots/mm, and every 2 lines when it is 8 dots/mm. The data is enlarged to data of 16 dots/mm, which in turn is transferred as a command ACMD to the FAC (font address controller) 716.

(II-6) Annotation Processor

Figure 21:
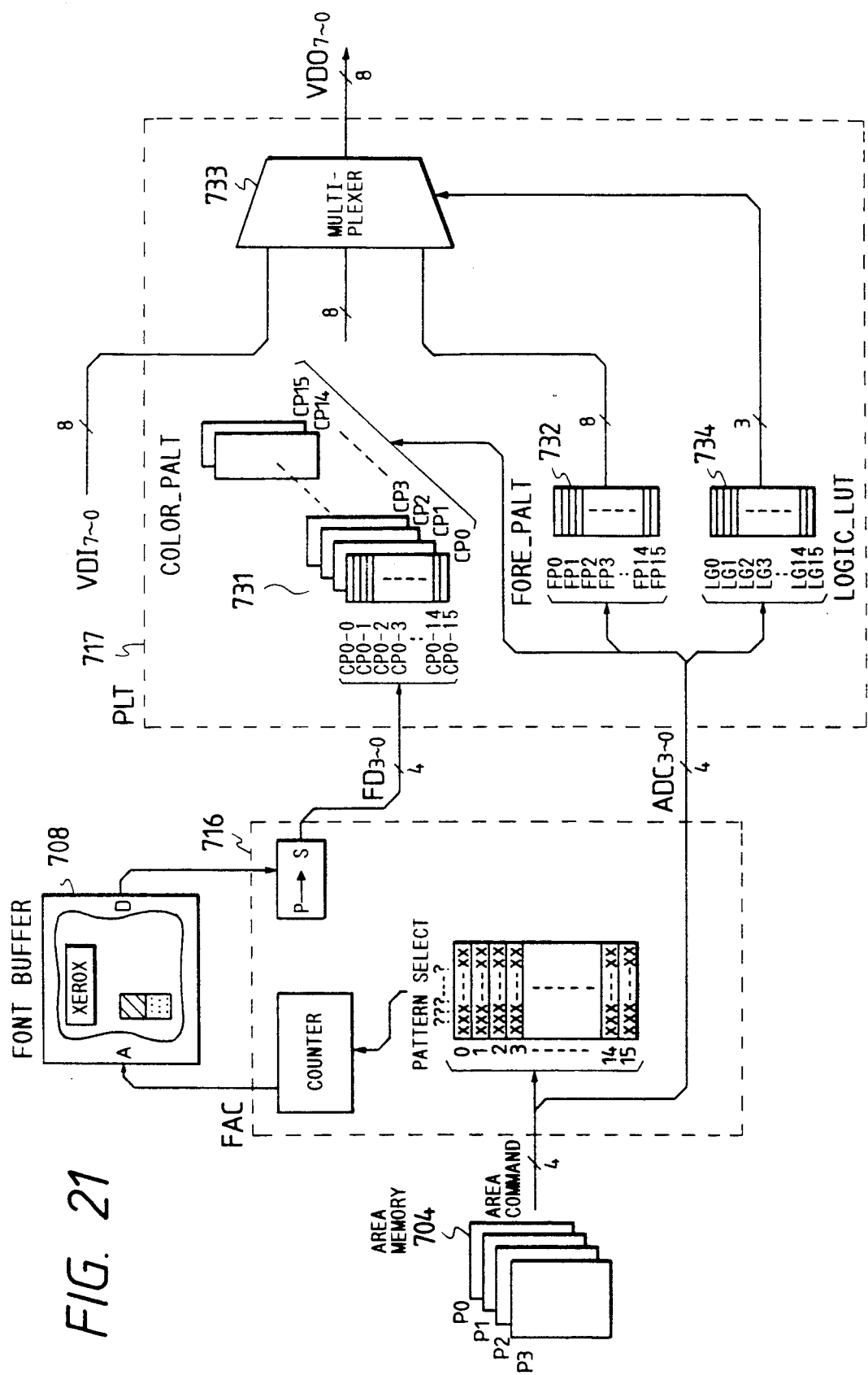
FIG. 21 shows signals flows among the FAC, the font buffer, and the PLT.

FIG. 21 shows signals flows among the FAC, the font buffer, and the PLT.

(A) Circuit Arrangement

The annotation processor functions as follows. 4-bit area commands ACMD3 to ACMD0 corresponding to each annotation, and area commands ACMD3 to ACMD0 of a total of 16 kinds of annotations are read out of the plane memory 704 in synchronism with the image data. In the IRE, the data is enlarged to the data of the resolution equal to the of the image data, and is transferred. By executing.the command areas ACMD3 to ACMD0, within a marker area, a closed area, a rectangular area, or a free-shape area, character (foreground) or background is painted by a preset color or replaced by a pattern, such as mesh, hatching and solid, while recognizing the foreground and background. To effect the function, the annotation processing circuit includes the font buffer 708, the FAC 716, and the PLT 707, as shown in FIG. 21. The font buffer 708 stores font data (pattern) FD3 to FD0, such as mesh, hatching, and logo. The FAC 716 generates an address of the font buffer 708 according to the area command, and reads out the font data FD3 to FD0 from the buffer by the address. The PLT 707 replaces the image data with a color signal of the font by the font data FD3 to FD0 and the area commands ACMD3 to ACMD0.

The font buffer 708 is accessible from a logo pattern memory (ROM) 705 which is set by a user or the VCPU, and stores fonts of patterns such as mesh, hatching, solid, and logo. When the font buffer 708 is formed of one plane, color can be switched between two colors by the font data FD0. When it is formed of 4 planes, sixteen colors can be selectively used, using the font data FD3 to FD0.

The FAC 716 includes a table for selecting a pattern from the area commands ACMD3 to ACMD0, an address generating counter for reading out font data of the pattern selected by the table, from the font buffer 708, and a circuit for transferring font data ACMD3 to ACMD0 from the font buffer 708. A maximum of sixteen patterns, such as mesh, hatching, solid, and logo, may be preset in the table, corresponding to the area commands ACMD3 to ACMD0.

The PLT 707 is made up of a color palette (COLOR-PALT) 731, a fore palette (FORE - PALT) 732, and a logic LUT (LGIC - LUT) 734, and a multiplexer 733. The color palette 731 contains color data of sixteen colors corresponding to the area commands ACMD3 to ACMD0, and offers the color data up to 16 colors to one annotation. When an annotation is outputted to both character portion (foreground) and background, the fore palette 732 offers a maximum of 16 colors to the foreground. The logic LUT 734 provides a select signal (logic operation select signal) to select the image data or the output data of a color palette 731 or a fore palette 732 according to the area commands ACMD3 to ACMD0. The multiplexer 733 selects document data or annotation data according to the logic operation select signal.

The operation of the annotation processing circuit thus arranged will be described.

It is assumed that font data, such as mesh, hatching and logo, is previously stored in the font buffer 708, and that the start address of the font data corresponding to the area commands ACMD3 to ACMD0 has been stored in the table of the FAC 716. In the PLT 707, a logic operation select signal is stored in the logic LUT 734. As already stated, the color palette 731 contains sixteen (16) planes. One of the planes is selected by the 4-bit area commands ACMD3 to ACMD0. Data stored in the selected plane is selected by font data FD3 to FD0. When the annotation is outputted to both the foreground and the background, color for the foreground is stored in the fore palette 732. The color in the palette is replaced with another one every developing cycle.

Let us consider a case that a pattern of hatching is, for example, "0010" of the area commands ACMD3 to ACMD0. In this case, for the hatching area, "1" is drawn in one plane P1 corresponding to bit "1" in the memory plane 704 consisting of four planes. Accordingly, in this area, the area command data ACMD0 to ACMD3 of "0010" is read out of the plane memory 704 in synchronism with the image data.

In the FAC 16, when the area command data ACMD0 to ACMD3 of "0010" is received, font data FD3 to FD0 of the hatching pattern is read out from the font buffer 708 according to the area command data. The area command data ACMD3 to ACMD0, and font data FD3 to FD0 is delivered to the PLT 717.

In the PLT 717, according to the area command data ACMD3 to ACMD0, a logic operation select signal is selected, which is for a hatching pattern stored in LG1 of the logic LUT 734. In the color palette 731, a color palette of CP1 is selected. One of 16-color data of the color palette is selected according to the font data FD3 to FD. If the font data FD3 to FD0 is, for example, "1101" ("13" in decimal number), color data of CP1 - 13 in the CP1 color palette is selected. The multiplexer 733 recognizes the foreground and background in the image data, and according to the logic operation select signal, produces image data for the foreground, and color data for the background.

As described above, the font data FD3 to FD0 and the logic operation select signal are read out corresponding to the area command data ACMD0 to ACMD3. Further, the color for annotation is selected from the area command data ACMD0 to ACMD3 and the font data FD3 to FD0. The image data is replaced with a specific font. In this way, the edit processing proceeds. Accordingly, the font data FD3 to FD0 contains patterns, such as mesh, hatching, solid, and logo, and color information as well. A single pattern may have various combinations of different colors by changing the contents of the font data FD3 to FD0 or the area command data ACMD0 to ACMD3.

Let us consider a case that in the FAC 716, the same pattern is stored as "0001" and "0010" of the ACMD0 to ACMD3, for example. In this case, if the font data FD3 to FD0 becomes the same, the different color palettes 731, e.g., CP1 and CP2. Further, where a pattern is stored as "1101", "1110", and "1111" of the font data FD3 to FD0, color data different from the color data of A, B, and C is selected in the color palette 731, comparing with the case where the pattern is stored as "0101", "0110", and "0111" (color data of A, B, and C in the palette 731) of the font data FD3 to FD0.

(III) OVERALL PROCESSING FLOW

Figure 22:
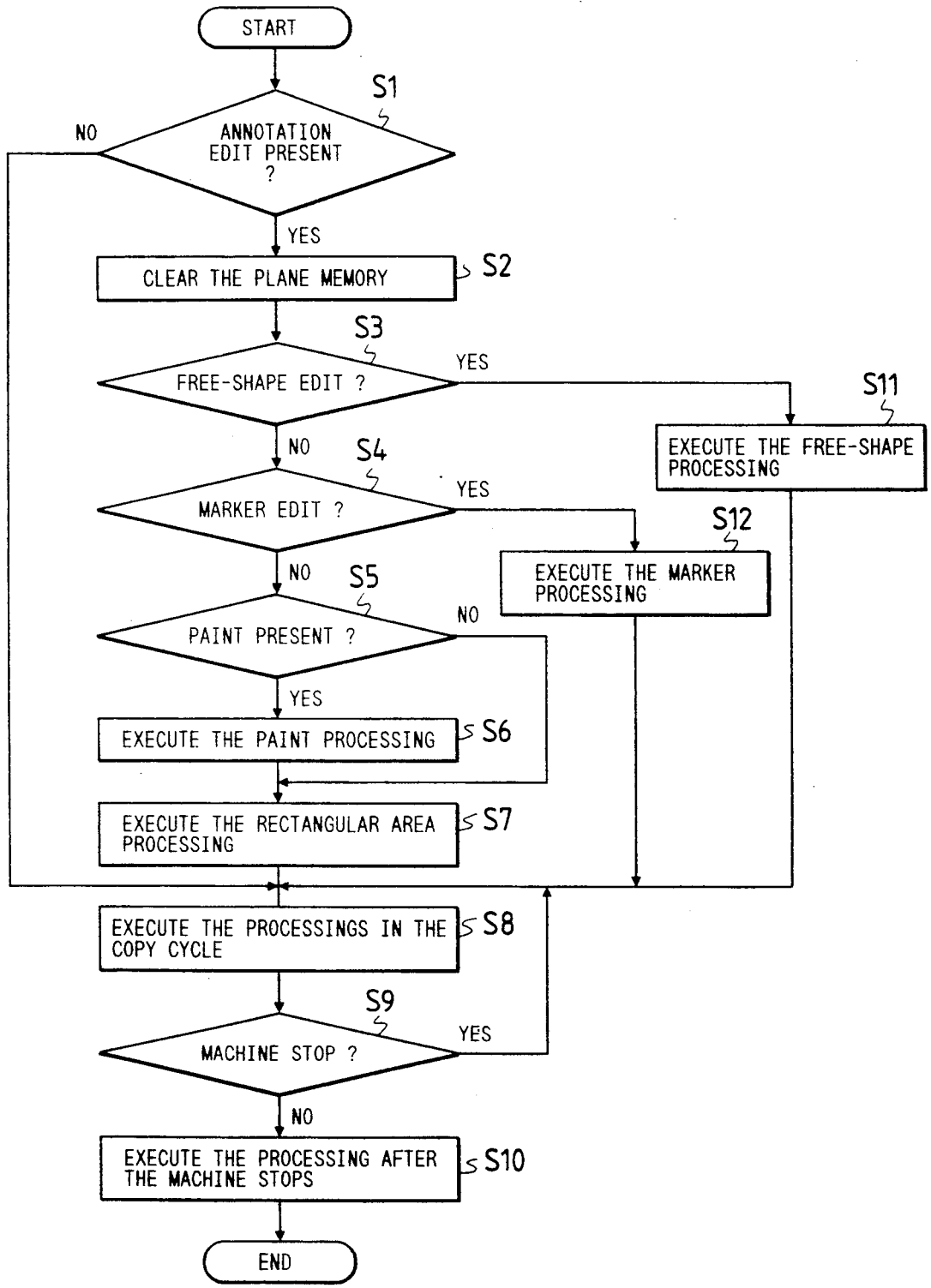
FIG. 22 is a flowchart for explaining an overall processing flow of the processing system of the invention.
Figure 23:
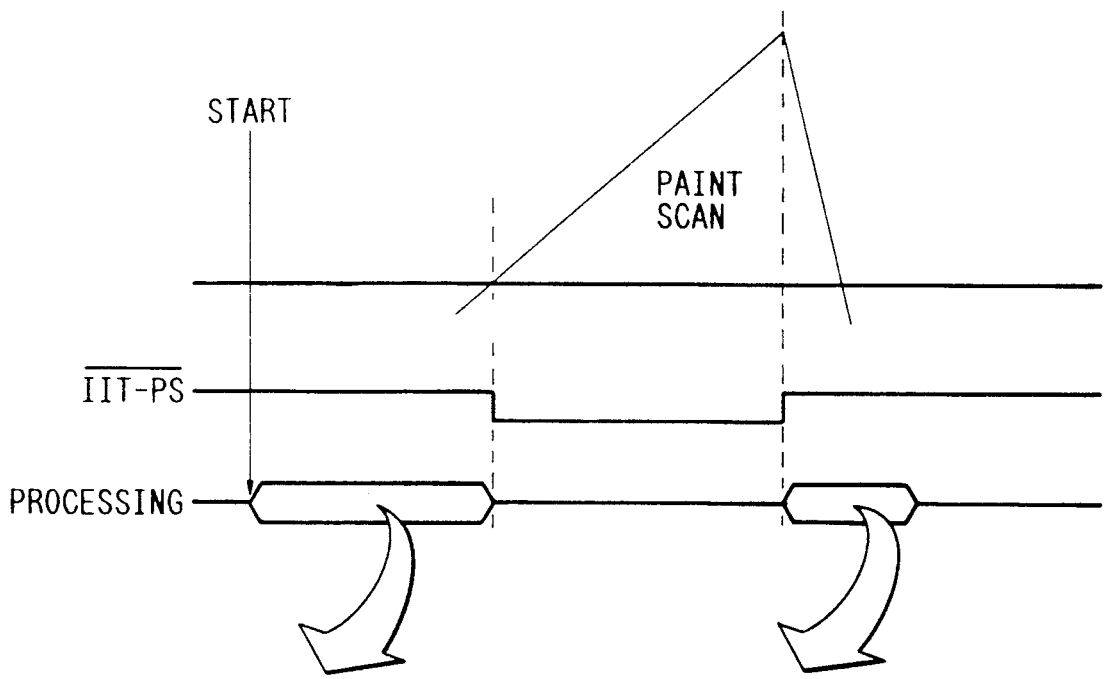
FIG. 23 is an explanatory diagram for explaining the settings in paint mode.
Figure 24C:
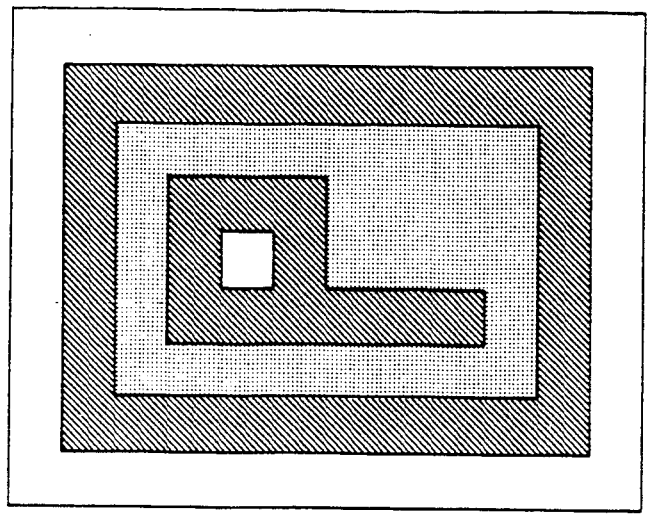
FIG. 24a–24c are diagrams for explaining the problems of the paint processing.
Figure 24B:
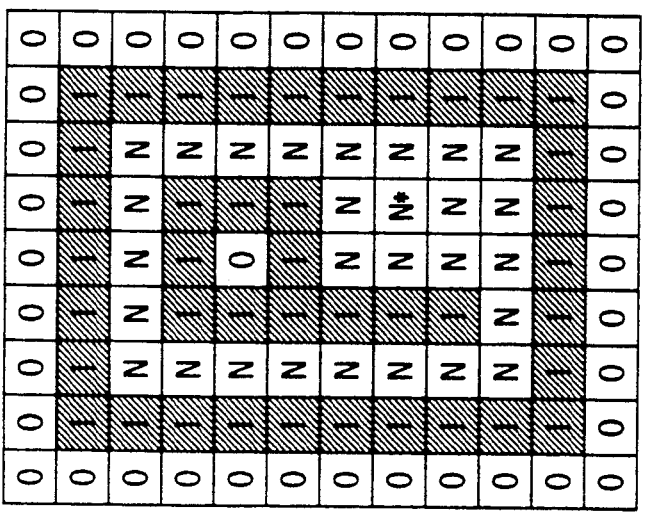
Figure 24A:
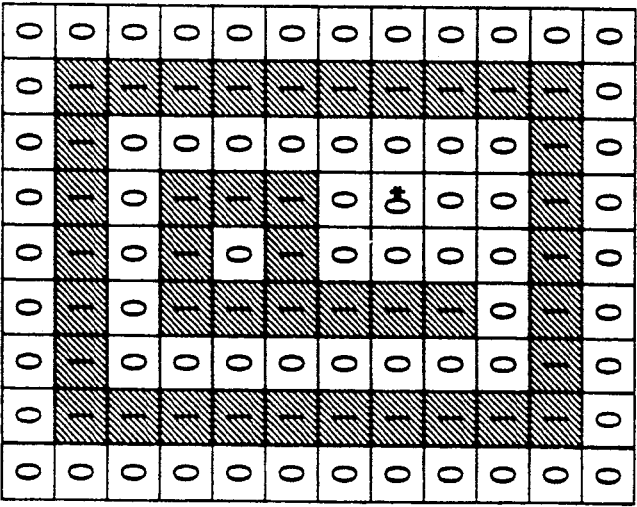

FIG. 22 is a flowchart for explaining an overall processing flow of the paint processing system of the invention. FIG. 23 is an explanatory diagram for explaining the settings in the paint mode.

An overall flow of the invention when it is applied for an image processing apparatus, e.g., a copying machine, is shown in FIG. 22. An operator sets copy conditions and edits, and pushes a start key. Then, the copying machine operates as shown in FIG. 22.

The machine checks whether an annotation edit is present or not, and if not, proceeds to a copy cycle. If present, the machine clears the plane memory, and checks if there is the edit of a free-shape, maker, paint, or rectangular area, and if any of them is present, the machine executes the edit and proceeds to the copy cycle.

In the paint edit processing, as shown in FIG. 23, after start, the machine sets the IRE, such as setting of a threshold value for paint, the DMC, such as the number of lines in the vertical scan direction, and sets the AGDC. After the paint edit, the machine resets the DMC and then the AGDC.

It should be understood that the present invention is not limited to the embodiment as mentioned above, but may variously be changed, modified, and altered within the scope of the appended claims. In the above-mentioned embodiment, the plane memory consists of six memory planes. If required, one memory plane for work may be used for both the work and drawing purposes. In this case, the plane memory P0 is used as a plane memory PM in FIG. 4. A drawing in the plane PM (FIG. 4(e)) is copied in the plane PW, and the plane PM is cleared. Then, it may be used as the plane memory P0 for drawing. The plane memory for drawing consists of four memory planes in the embodiment. It is evident, however, that the number of the memory planes is not limited to four, but may be increased or decreased according to the number of the area commands.

As seen from the foregoing description, in the invention, the area commands are set such that a closed area is painted, an area outside the closed area is painted, and an area inside the closed area is painted. Therefore, the closed area including a space therein can completely be painted with color by merely designating a point within the closed area as an edit another plane memory for drawing with reference to the outside point.

What is claimed is:

1. A paint processing method in an image processing apparatus having a plane memory means for converting color separation signals obtained by reading an original document into record signals for developing colors, respectively, selecting a record signal from the record signals in each developing cycle to record and reproduce an image of the original document, and painting a closed area on the original document with a specific pattern or color, said paint processing method comprising the steps of:

storing in said plane memory, binary image data of the original document, which is obtained by prescanning the original document;

first painting a closed area of the original document from a start point within said closed area, said start point being designated with reference to said binary image data;

second painting an area outside of said painted closed area; and third painting an area inside of said patined outside area with either a specific pattern or color.

2. The paint processing method as defined in claim 1 wherein said memory means comprises a plurality of plane memories, the outside area of said painted closed area being drawn in a plane memory for work, and an area command for painting with either a specific pattern or color being set in another plane memory for drawing with reference to the outside painted area drawn in said plane memory for work.

3. The paint processing method as defined in claim 2 wherein said memory means comprises a plurality of plane memories for drawing and an area command is set for each area in said plural plane memories.

4. The paint processing method as defined in claim 2 wherein said memory means comprises two plane memories for first and second plane memories.

* * * * *

UNITED STATES PATENT AND TRADEMARK OFFICE
CERTIFICATE OF CORRECTION

PATENT NO. : 5,142,355
DATED : August 25, 1992
INVENTOR(S) : Toshitaka Fujima It is certified that error appears in the above-identified patent and that said Letters Patent is hereby corrected as shown below:

Claim 1, column 20, line 61, change "patined" to --painted--.

Claim 4, column 22, line 5, after "for" insert --work, and an area painting processing is performed between--.

Signed and Sealed this

Twenty-sixth Day of October, 1993

Attest:

BRUCE LEHMAN

Attesting Officer

Commissioner of Patents and Trademarks